US010912169B2

(12) United States Patent
Mun et al.

(10) Patent No.: US 10,912,169 B2
(45) Date of Patent: Feb. 2, 2021

(54) LED LIGHTING APPARATUS

(71) Applicant: SILICON WORKS CO., LTD., Daejeon (KR)

(72) Inventors: Gyeong Sik Mun, Sejong (KR); Sang Young Lee, Jeonju-si (KR); Ki Soo Kwon, Daejeon (KR); Ki Chul An, Daejeon (KR); Yong Geun Kim, Suwon-si (KR)

(73) Assignee: Silicon Works Co., Ltd., Daejeon-si (KR)

( * ) Notice: Subject to any disclaimer, the term of this patent is extended or adjusted under 35 U.S.C. 154(b) by 0 days.

(21) Appl. No.: 16/320,514

(22) PCT Filed: Jul. 25, 2017

(86) PCT No.: PCT/KR2017/007979
§ 371 (c)(1),
(2) Date: Jan. 25, 2019

(87) PCT Pub. No.: WO2018/021789
PCT Pub. Date: Feb. 1, 2018

(65) Prior Publication Data
US 2019/0274198 A1 Sep. 5, 2019

(30) Foreign Application Priority Data

Jul. 25, 2016 (KR) .................. 10-2016-0094207
Mar. 6, 2017 (KR) .................. 10-2017-0028407

(51) Int. Cl.
*H05B 33/08* (2020.01)
*H05B 45/00* (2020.01)
(Continued)

(52) U.S. Cl.
CPC ............. *H05B 45/00* (2020.01); *H05B 33/08* (2013.01); *H05B 45/37* (2020.01); *H05B 45/44* (2020.01); *H05B 45/50* (2020.01)

(58) Field of Classification Search
CPC ................ H05B 33/08; H05B 33/0815; H05B 33/0824; H05B 33/0827; H05B 33/083;
(Continued)

(56) References Cited

U.S. PATENT DOCUMENTS 9,398,660 B2 * 7/2016 Kim .................... H05B 33/0815
9,485,830 B2 * 11/2016 Sakai ................. H05B 33/0824
(Continued)

FOREIGN PATENT DOCUMENTS

KR 10-2013-0117133 10/2013
KR 10-1465758 11/2014
(Continued)

OTHER PUBLICATIONS

International Search Report for International Application No. PCT/KR2017/007979, dated Nov. 17, 2017.
(Continued)

*Primary Examiner* — Thai Pham
(74) *Attorney, Agent, or Firm* — Polsinelli PC

(57) ABSTRACT

Disclosed is an LED lighting apparatus. The LED lighting apparatus may include a leakage current control unit configured to provide a leakage current path when a rectified voltage is retained at a predetermined voltage or less for a preset time or more, and a leakage current and retention current may be discharged through a leakage current path.

23 Claims, 7 Drawing Sheets

(51) Int. Cl.
H05B 45/37 (2020.01)
H05B 45/44 (2020.01)
H05B 45/50 (2020.01)

(58) Field of Classification Search
CPC .............. H05B 33/0842; H05B 33/089; H05B 33/0848; H05B 37/02; H05B 45/00; H05B 45/37; H05B 45/44; H05B 45/48; H05B 45/50
See application file for complete search history.

(56) References Cited

U.S. PATENT DOCUMENTS

| | | | | |
|---|---|---|---|---|
| 2014/0049174 A1* | 2/2014 | Radermacher | ..... | H05B 33/0821 315/200 R |
| 2015/0002045 A1* | 1/2015 | Hwang | ................. | H05B 45/14 315/291 |
| 2015/0163875 A1* | 6/2015 | Yu | ........................ | H05B 33/083 315/201 |
| 2016/0119985 A1* | 4/2016 | Kim | ........................ | H05B 45/37 315/232 |
| 2016/0143107 A1* | 5/2016 | Kim | ........................ | H05B 45/50 315/121 |
| 2016/0227617 A1* | 8/2016 | Kim | ................... | H05B 33/0845 |

FOREIGN PATENT DOCUMENTS

| | | |
|---|---|---|
| KR | 10-2015-0001358 | 1/2015 |
| KR | 10-2015-0002082 | 1/2015 |
| KR | 10-2015-0002096 | 1/2015 |
| KR | 10-2015-0146168 | 12/2015 |
| KR | 10-2016-0047175 | 5/2016 |
| KR | 10-2016-0150440 | 12/2016 |

OTHER PUBLICATIONS

Written Opinion for International Application No. PCT/KR2017/007979 with English translation, dated Nov. 17, 2017.

* cited by examiner

Leakage current path is formed

LED LIGHTING APPARATUS

BACKGROUND

1. Technical Field

The present disclosure relates to an LED lighting apparatus, and more particularly, to an LED lighting apparatus capable of preventing ghosting.

2. Related Art

A lighting apparatus is designed to use a light source which exhibits high light emission efficiency using a small amount of energy, in order to reduce energy consumption. Representative examples of the light source used in the lighting apparatus may include a light emitting diode (LED).

The LED is differentiated from other light sources in terms of various aspects such as energy consumption, lifetime and light quality. Since the LED is driven by a current, the lighting apparatus using the LED as a light source inevitably requires many additional circuits for current driving.

In order to solve the above-described problem, an AC direct-type lighting apparatus has been developed in order to provide an AC voltage to an LED. The AC-direct type lighting apparatus is configured to convert an AC voltage into a rectified voltage, and drive a current using the rectified voltage such that the LED emits light. The rectified voltage indicates a voltage obtained by full-wave rectifying an AC voltage. Since the AC direct-type lighting apparatus directly uses a rectified voltage without using an inductor and capacitor, the AC direct-type lighting apparatus has a satisfactory power factor. The AC direct-type lighting apparatus using the LED is defined as an LED lighting apparatus.

The LED lighting apparatus may employ a dimmer for implementing a dimming function. The dimmer is configured to decide a position where the phase of an AC voltage is triggered in response to a change in charging voltage thereof, i.e. a phase angle. That is, the dimmer can output a phase-controlled AC voltage, the LED lighting apparatus generates a rectified voltage using the phase-controlled AC voltage, and the light source including the LED emits light in response to the phase-controlled rectified voltage.

Through the phase angle control of the dimmer, the brightness of the light source may be changed in response to the phase angle of the rectified voltage which changes between a dimming-off level for turn-off and the maximum level.

The LED lighting apparatus may be turned off when the dimmer controls the phase angle to the preset dimming-off level or less. In general, the dimmer requires a retention current for a stable operation in response to a rectified voltage equal to or less than the dimming-off level.

A general LED apparatus may emit faint light due to ghosting, even when the LED lighting apparatus is turned off.

The ghosting may act as a factor that not only unnecessarily consumes power, but also causes undesirable faint light, thereby degrading the reliability of the LED lighting apparatus.

The ghosting may be caused by a leakage current based on various reasons. First, when an analog or digital dimmer is used, the dimmer requires a retention current for a minimum operation. The retention current may flow as a leakage current through a lighting unit including an LED light source, even when the LED light source is turned off.

When the LED lighting apparatus is installed for indoor lighting, a switch for controlling light emission of the lighting unit may require long wires. In the above-described structure, energy may be accumulated by coupling between wires which are long and adjacent to each other. More specifically, energy may be accumulated in the adjacent wires through static induction caused by capacitance and magnetic induction caused by a current flow, and a minute current may be generated by the accumulated energy. The minute current may flow as a leakage current into the lighting unit including the LED light source.

When the LED lighting apparatus is used as a sensor light, a snubber may be installed in the LED lighting apparatus in order to prepare for a surge which is caused by an inrush current. At this time, a leakage current may be generated through the snubber, and then flow into the lighting unit including the LED light sources.

The leakage current which is generated due to the above-described various reasons may flow into the lighting unit including the LED light sources, and some of the LED light sources included in the lighting unit may emit faint light in an unstable state, due to the leakage current. That is, the leakage current may cause ghosting in the LED lighting apparatus.

The ghosting not only unnecessarily consumes power, but also causes afterlight. Therefore, the LED lighting apparatus may cause light pollution due to ghosting.

The ghosting may remarkably occur in an LED lighting apparatus using a rectified voltage. Since the LED lighting apparatus is configured to emit light using an AC input, the impedance of an input side is typically high. Therefore, a high AC voltage may be formed even by a small amount of leakage current, and then directly applied to the LED. That is, since a small amount of leakage current may cause the LED to easily emit light, ghosting may remarkably appear in the LED lighting apparatus.

In order to remove ghosting or the like, a bleeder may be configured in parallel to the entire LED sources or each of the LED sources. The LED lighting apparatus may be configured to bypass a leakage current through the bleeder.

In this case, however, since the bleeder continuously discharges a leakage current even when the LED light sources emit light, the bleeder acts as a factor that reduces the entire power efficiency.

SUMMARY

Various embodiments are directed to an LED lighting apparatus which can prevent ghosting due to a leakage current, prevent light pollution caused by afterlight, and reduce an unnecessary power loss, when a rectified voltage provided to LED light sources or a driving current by light emission of the LED light sources falls below a predetermined level due to turn-off of the LED light sources.

Also, various embodiments are directed to an LED lighting apparatus which can interrupt a retention current flowing to LEDs while a rectified voltage is controlled by a dimmer to turn off a lighting unit, an prevent some LEDs from emitting faint light due to a leakage current caused by the retention current.

In an embodiment, an LED lighting apparatus may include: a lighting unit including a plurality of LED light sources that sequentially emit light in response to changes of a rectified voltage; a driver configured to provide a driving current path for the sequential emission of the plurality of LED light sources; and a leakage current control unit configured to provide a leakage current path through which a leakage current inputted to an input terminal of the lighting unit is discharged to a ground, when the rectified voltage is retained at a predetermined voltage or less for a preset time or more.

In an embodiment, an LED lighting apparatus may include: a lighting unit including a plurality of LED light sources that sequentially emit light in response to changes of a rectified voltage; a driver configured to selectively provide a first leakage current path for a leakage current inputted to an input terminal of the lighting unit and a driving current path for the sequential light emission of the plurality of LED light sources, in response to a change of the rectified voltage; and a leakage current control unit configured to provide a second leakage current path through which the leakage current inputted to the input terminal of the lighting unit is discharged to the first leakage current path of the driver, when the rectified voltage is retained at a predetermined voltage or less for a preset time.

In an embodiment, an LED lighting apparatus may include: a lighting unit including a plurality of LED light sources that sequentially emit light in response to changes of a rectified voltage; a driver configured to provide a driving current path for the sequential emission of the plurality of LED light sources; and a leakage current control unit configured to provide a leakage current path through which a leakage current inputted to the input terminal of the lighting unit is discharged to the driving current path for light emission of a first LED light source of the driver, when the rectified voltage is retained at a predetermined voltage or less for a preset time.

In an embodiment, an LED lighting apparatus may include: a power supply unit configured to rectify an AC voltage of which the phase is controlled by a dimmer, and provide the rectified voltage; a lighting unit including a plurality of LED light sources that sequentially emit light when the rectified voltage equal to or more than a first level is applied from the power supply unit; a leakage current control unit connected to a node between the power supply unit and the lighting unit, and configured to receive the rectified voltage, and provide a leakage current path to the node when the rectified voltage less than the first level is applied; a driver having channels connected to the leakage current path of the leakage current control unit and the plurality of LED light sources, respectively, and configured to form a driving current path for one of the channels by comparing a sensing voltage to internal reference voltages preset for the respective channels; and a sensing resistor connected to the driving current path of the driver, and configured to provide the sensing voltage obtained by sensing a driving current.

In accordance with the present embodiments, the LED lighting apparatus can remove ghosting of the LED light sources due to a leakage current. Thus, the turn-off of the LED lighting apparatus can be stabilized.

Furthermore, by removing ghosting, the LED lighting apparatus prevent light pollution caused by afterlight, and reduce an unnecessary power loss.

Furthermore, the LED lighting apparatus may include the leakage current control unit to prevent a leakage current from flowing through the LED light sources, and prevent a degradation in reliability which may occur when some LEDs of the lighting unit emit faint light.

DETAILED DESCRIPTION

Figure 1:
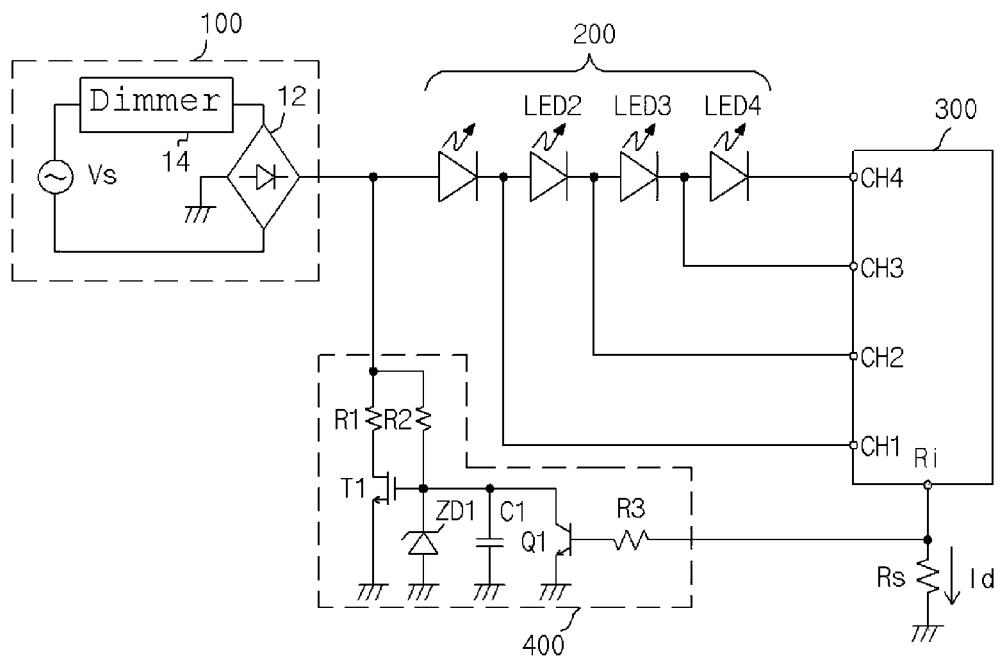
FIG. 1 is a circuit diagram illustrating an LED lighting apparatus according to an embodiment of the present invention.

Exemplary embodiments will be described below in more detail with reference to the accompanying drawings. The disclosure may, however, be embodied in different forms and should not be constructed as limited to the embodiments set forth herein.

Rather, these embodiments are provided so that this disclosure will be thorough and complete, and will fully convey the scope of the disclosure to those skilled in the art. Throughout the disclosure, like reference numerals refer to like parts throughout the various figures and embodiments of the disclosure.

An LED lighting apparatus according to an embodiment of the present invention includes a plurality of LEDs having a semiconductor emission characteristic as light sources. Each of the LED light source according to the embodiment of the present invention may be configured as a group including one or more LEDs. During sequential light emission, each of the groups may serve as a unit which is turned on/off. For convenience of description, each of the LED light sources is represented by one LED.

The LED lighting apparatus according to the embodiment of the present invention is configured as an AC direct-type LED lighting apparatus. The AC-direct type lighting apparatus controls an LED to emit light using a rectified voltage obtained by converting an AC voltage. The rectified voltage has a waveform obtained by full-wave rectifying an AC voltage having a sine wave. That is, the rectified voltage has a ripple that the voltage level rises/falls by the half period of a commercial AC voltage.

Therefore, the LED lighting apparatus according to the embodiment of the present invention is configured in such a manner that a lighting unit including the LEDs emits light using a rectified voltage as an input voltage, and a driver provides a driving current path in response to the light emission of the lighting unit.

In the present embodiment, when a driving state of the lighting unit corresponds to a preset leakage current interrupting condition, the LED lighting apparatus forms a leakage current path in order to remove ghosting which occurs when a leakage current flows into the lighting unit.

The LED lighting apparatus may sense whether the driving state of the lighting unit corresponds to the leakage current interrupting condition, based on the rectified voltage provided to the LED light sources which sequentially emit light, a voltage applied across the LED light source which first emits light during the sequential light emission, or a driving current depending on light emission.

In the present embodiment, representative examples of the case corresponding to the leakage current interrupting condition may include a case in which the rectified voltage is retained at a predetermined voltage or less for a preset time or more in order to turn off the entire light sources, i.e. the lighting unit. Furthermore, the case corresponding to the leakage current interrupting condition may include a case in which the lighting unit is turned off because the rectified voltage is less than a specific level.

The leakage current path may be connected to the ground from an input terminal of the lighting unit, connected to the driver from the input terminal of the lighting unit, or connected to the driving current path of the LED light source that first emits light during sequential light emission. As the leakage current path is formed, a leakage current may be directly discharged to the ground or discharged to the ground via the driver. When the leakage current is discharged to the ground via the driver, the leakage current may be discharged through the driving current path which is formed for sequential light emission. However, the leakage current may be discharged through a leakage current path which is formed separately from the driving current path for sequential light emission.

The LED lighting apparatus according to the embodiment of the present invention includes a leakage current control unit configured to provide a leakage current path through which a leakage current is discharged without passing through the lighting unit, and the leakage current control unit provides the input terminal of the lighting unit with the leakage current path through which a leakage current is discharged without passing through the lighting unit, when a driving state of the lighting unit corresponds to the leakage current interrupting condition.

According to the above-described configuration, when the driving state of the lighting unit corresponds to the leakage current interrupting condition, the leakage current control unit provides the leakage current path to the input terminal of the lighting unit.

First, as illustrated in FIG. 1, the leakage current control unit may be configured to form a leakage current path which is connected to the ground from the input terminal of the lighting unit, in order to discharge a leakage current. Furthermore, when the amount of driving current outputted from a driving current path of the driver is retained at a predetermined level or less for a preset time, the leakage current control unit may form a leakage current path.

Hereafter, a configuration and operation of the LED lighting apparatus according to the embodiment of FIG. 1 will be described in detail.

The LED lighting apparatus according to the embodiment of FIG. 1 includes a power supply unit 100, a lighting unit 200, a driver 300, a leakage current control unit 400 and a sensing resistor Rs.

The power supply unit 100 rectifies an AC voltage of an AC power supply Vs, and outputs the rectified voltage Vrec. The power supply unit 100 may include the AC power supply Vs for providing the AC voltage and a rectifier circuit 12 for rectifying the AC voltage and outputting the rectified voltage Vrec. The AC power supply Vs may include a commercial power supply.

The rectifier circuit 12 outputs the rectified voltage Vrec obtained by full-wave rectifying the AC voltage. In the present embodiment, a rise or fall of the rectified voltage Vrec may be understood as a rise or fall of ripple of the rectified voltage. The current outputted from the rectifier circuit 12 in response to a rise or fall of the rectified voltage Vrec corresponds to a rectified current, and has substantially the same waveform as a driving current Id of the driver 300 which will be described below.

The power supply unit 100 may include a dimmer 14 for adjusting the AC voltage. Specifically, the dimmer 14 may cut the phase of the AC voltage, and provide the phase-cut AC voltage to the rectifier circuit 12. Thus, the AC voltage of which the phase is controlled by the operation of the dimmer 14 may be provided to the rectifier circuit 12, and the rectifier circuit 12 may output the rectified voltage Vrec corresponding to the phase-cut AC voltage. The dimmer 14 may act as a factor which provides a leakage current to the lighting unit 200, when the lighting unit 200 is turned off.

The lighting unit 200 may include a plurality of LED light sources, and each of the LED light sources may include a plurality of LEDs. The plurality of LED light sources are sequentially turned on/off by increases/decreases of the rectified voltage Vrec provided from the power supply unit 100. FIG. 1 illustrates that the lighting unit 200 includes four LED light sources LED1 to LED4.

The driver 300 is configured to provide a driving current path corresponding to sequential light emission of the LED light sources LED1 to LED4 by comparing a sensing voltage of the sensing resistor Rs to internal reference voltages corresponding to the respective LED light sources LED1 to LED4.

The driver 300 has channel terminals CH1 to CH4 connected to output terminals of the LED light sources LED1 to LED4, respectively, and a sensing terminal Ri connected to the sensing resistor Rs. The driver 300 controls a change in current path between the channel terminals CH1 to CH4 and the sensing terminal Ri.

The sensing resistor Rs is installed between the driver 300 and the ground. According to the above-described configuration, the sensing resistor Rs provides a sensing voltage corresponding to the light emitting state of each of the LED light sources LED1 to LED4. The driving current Id flowing through the sensing resistor Rs may be changed according to the light emitting state of each of the LED light sources LED1 to LED4 in the lighting unit 200. The driving current Id flowing through the sensing resistor Rs may be understood as the same current as a driving current on the driving current path provided by the driver 300.

According to the above-described configuration, the driver 300 provides the driving current path corresponding to the light emission of each of the LED light sources LED1 to LED4, and regulates a flow of the driving current Id provided to the sensing resistor Rs on the driving current path.

The LED light sources LED1 to LED4 of the lighting unit 200 are sequentially turned on or off in response to changes of the rectified voltage Vrec. Among the LED light sources LED1 to LED4, the LED light source LED1 connected to the output terminal of the rectifier circuit 12 first emits light in response to a rise of the rectified voltage Vrec, and the LED light source LED4 positioned at the last stage finally emits light in response to a rise of the rectified voltage Vrec. The input terminal of the LED light source LED1 forms the input terminal of the lighting unit 200.

When the rectified voltage Vrec rises to sequentially reach the light emission voltages of the respective LED light sources LED1 to LED4, the driver 300 provides the driving current path corresponding to the light emission of each of the LED light sources LED1 to LED4.

The light emission voltage V4 for controlling the LED light source LED4 to emit light is defined as the voltage at which all of the LED light sources LED1 to LED4 emit light. The light emission voltage V3 for controlling the LED light source LED3 to emit light is defined as the voltage at which all of the LED light sources LED1 to LED3 emit light. The light emission voltage V2 for controlling the LED light source LED2 to emit light is defined as the voltage at which both of the LED light sources LED1 and LED2 emit light. The light emission voltage V1 for controlling the LED light source LED1 to emit light is defined as the voltage at which only the LED light source LED1 emits light.

Figure 2:
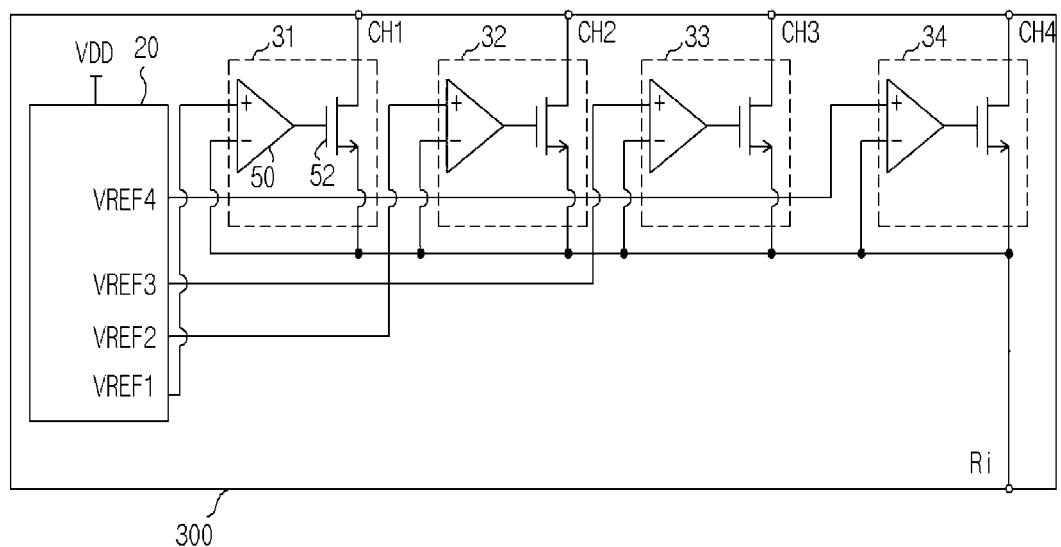
FIG. 2 is a detailed circuit diagram of a driver of FIG. 1.

As illustrated in FIG. 2, the driver 300 includes switching circuits 31 to 34 for providing driving current paths for the LED light sources LED1 to LED4 and a reference voltage supply unit 20 for supplying reference voltages VREF1 to VREF4.

The reference voltage supply unit 20 may be configured to provide the reference voltages VREF1 to VREF4 having different levels, depending on a designer's intention.

The reference voltage supply unit 20 may include a plurality of resistors connected in series to receive a constant voltage VDD, and output the reference voltage VREF1 to VREF4 having different levels to nodes between the respective resistors. Unlike the above-described configuration, the reference voltage supply unit 20 may include independent voltage supply sources for providing the reference voltages VREF1 to VREF4 having different levels, respectively.

Among the reference voltages VREF1 to VREF4 having different levels, the reference voltage VREF1 may have the lowest voltage level, and the reference voltage VREF4 may have the highest voltage. The voltage levels of the reference voltages VREF1 to VREF4 may have a relation of VREF1>VREF2>VREF3>VREF4.

The reference voltage VREF1 has a level for turning off the switching circuit 31 at the point of time that the LED light source LED2 emits light. More specifically, the reference voltage VREF1 may be set to a lower level than a sensing voltage formed in response to the light emission of the LED light source LED2.

The reference voltage VREF2 has a level for turning off the switching circuit 32 at the point of time that the LED light source LED3 emits light. More specifically, the reference voltage VREF2 may be set to a lower level than a sensing voltage formed in response to the light emission of the LED light source LED3.

The reference voltage VREF3 has a level for turning off the switching circuit 33 at the point of time that the LED light source LED4 emits light. More specifically, the reference voltage VREF3 may be set to a lower level than a sensing voltage formed in response to the light emission of the LED light source LED4.

The reference voltage VREF4 may be set to a higher level than a sensing voltage in the upper limit level region of the rectified voltage.

The switching circuits 31 to 34 are connected to the sensing resistor Rs in common through the sensing terminal Ri, in order to perform current regulation and to form a driving current path.

The switching circuits 31 to 34 compare the sensing voltage of the sensing resistor Rs to the reference voltages VREF1 to VREF4 of the reference voltage supply unit 20, and form a driving current path corresponding to light emission of the lighting unit 200.

Each of the switching circuits 31 to 34 receives a high-level reference voltage as the switching circuit is connected to an LED light source remote from the position to which the rectified voltage is applied.

Each of the switching circuits 31 to 34 may include a comparator 50 and a switching element, and the switching element may be configured as an NMOS transistor 52.

Each of the comparators 50 of the switching circuits 31 to 34 has a positive input terminal (+) configured to receive the reference voltage, a negative input terminal (−) configured to receive a sensing voltage, and an output terminal configured to output a comparison result between the reference voltage and the sensing voltage.

Each of the NMOS transistors 52 of the respective switching circuits 31 to 34 performs a switching operation for controlling a flow of the driving current Id according to the output of the comparator, applied to the gate thereof.

Figure 3:
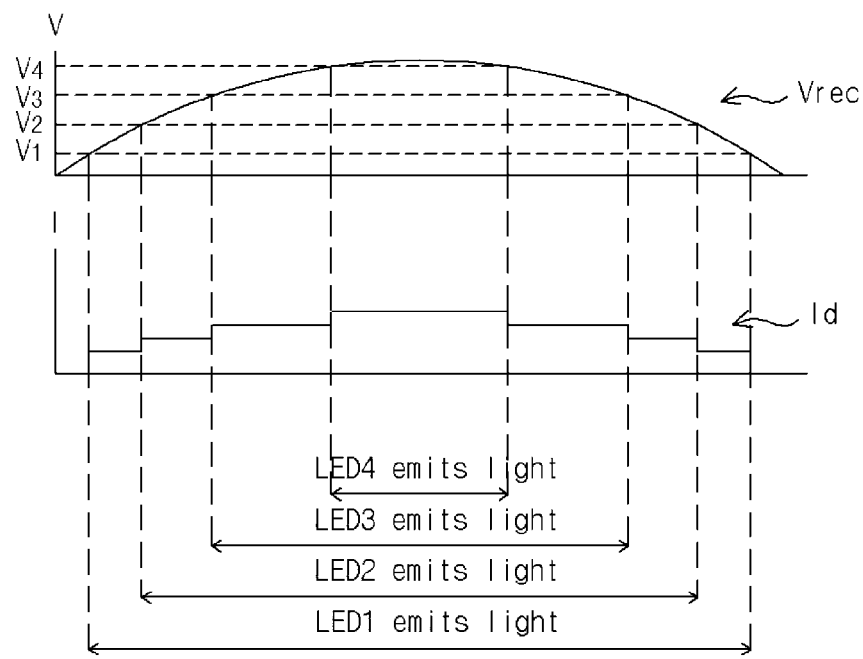
FIG. 3 is a waveform diagram for describing a light emitting operation of the LED lighting apparatus according to the embodiment of FIG. 1.

First, operations in which the light emitting states of the LED light sources LED1 to LED4 are changed in response to changes of the rectified voltage Vrec and the driving current path is changed in response to the changes of the light emitting states will be described with reference to FIG. 3.

When the rectified voltage Vrec is in the initial state, all of the switching circuits 31 to 34 maintain a turn-on state, because the reference voltages VREF1 to VREF4 applied to the positive input terminals (+) thereof are higher than the sensing voltage applied to the negative input terminals (−) thereof. At this time, the LED light sources LED1 to LED4 are in a turn-off state.

Then, when the rectified voltage Vrec rises to reach the light emission voltage V1, the LED light source LED1 emits light. When the LED light source LED1 emits light, the switching circuit 31 connected to the LED light source LED1 provides a driving current path. That is, the driving current path is formed by the switching circuit 31.

When the LED light source LED1 emits light, the driving current Id starts to flow through the driving current path formed by the switching circuit 31. However, since the sensing voltage at this time has a low level, the turn-on states of the switching circuits 31 to 34 are not changed.

Then, while the rectified voltage Vrec reaches the light emission voltage V2, the driving current Id is regulated to retain a constant amount through a regulation operation of the switching circuit 31.

When the rectified voltage Vrec reaches the light emission voltage V2, the LED light source LED2 emits light. When the LED light source LED2 emits light, the switching circuit 32 connected to the LED light source LED2 provides a driving current path. At this time, the LED light source LED1 also maintains the light emitting state.

When the LED light source LED2 emits light, the driving current Id starts to flow through the driving current path formed by the switching circuit 32. At this time, the level of the sensing voltage is higher than the reference voltage VREF1. Thus, the NMOS transistor 52 of the switching circuit 31 is turned off by an output of the comparator 50. That is, the switching circuit 31 is turned off, and the switching circuit 32 provides the driving current path corresponding to the light emission of the LED light source LED2.

Then, while the rectified voltage Vrec reaches the light emission voltage V3, the driving current Id is regulated to retain a constant amount through a regulation operation of the switching circuit 32.

When the rectified voltage Vrec reaches the light emission voltage V3, the LED light source LED3 emits light. When the LED light source LED3 emits light, the switching circuit 33 connected to the LED light source LED3 provides a driving current path. At this time, the LED light sources LED1 and LED2 also maintain the light emitting state.

When the LED light source LED3 emits light, the driving current Id starts to flow through the driving current path formed by the switching circuit 33. At this time, the level of the sensing voltage is higher than the reference voltage VREF2. Thus, the NMOS transistor 52 of the switching circuit 32 is turned off by an output of the comparator 50. That is, the switching circuit 32 is turned off, and the switching circuit 33 provides the driving current path corresponding to the light emission of the LED light source LED3.

Then, while the rectified voltage Vrec reaches the light emission voltage V4, the driving current Id is regulated to retain a constant amount through a regulation operation of the switching circuit 33.

When the rectified voltage Vrec reaches the light emission voltage V4, the LED light source LED4 emits light. When the LED light source LED4 emits light, the switching circuit 34 connected to the LED light source LED4 provides a driving current path. At this time, the LED light sources LED1 to LED3 also maintain the light emitting state.

When the LED light source LED4 emits light, the driving current Id starts to flow through the driving current path formed by the switching circuit 34. At this time, the level of the sensing voltage is higher than the reference voltage VREF3. Thus, the NMOS transistor 52 of the switching circuit 33 is turned off by an output of the comparator 50. That is, the switching circuit 33 is turned off, and the switching circuit 34 provides the driving current path corresponding to the light emission of the LED light source LED4.

Then, the rectified voltage Vrec starts to fall after reaching the upper limit level.

While the rectified voltage Vrec reaches the upper limit level, the driving current Id is regulated to retain a constant amount through a regulation operation of the switching circuit 34.

On the other hand, when the rectified voltage Vrec falls in a stepwise manner to the light emission voltages V4 to V1 from the upper limit level, the LED light sources LED 4 to LED1 are sequentially turned off. The driving current Id decreases in a stepwise manner in response to the turn-off of the LED light sources LED4 to LED1.

As described above, the driver 300 may change and provide the driving current path in response to the changes in light emitting state of the LED light sources LED1 to LED4.

While the LED light sources LED1 to LED4 sequentially emit light according to the changes of the rectified voltage Vrec, the leakage current control unit 400 senses the driving current Id which is outputted from the driver 300 and flows to the sensing resistor Rs.

When the rectified voltage Vrec is retained at the predetermined voltage or less for the preset time or more such that the entire LED light sources, i.e. the lighting unit, are turned off, the amount of driving current Id which is outputted from the driver 300 and flows to the sensing resistor Rs is retained at a predetermined level or less for a preset time or more. In response, the leakage current control unit 400 connects the input terminal of the lighting unit 200 to the ground, in order to form a leakage current path through which a leakage current is discharged.

For this operation, the leakage current control unit 400 includes resistors R1 to R3, an NMOS transistor T1, a Zener diode ZD1, a capacitor C1 and an NPN transistor Q1.

The NMOS transistor T1 is connected to the input terminal of the lighting unit 200 through the resistor R1. The resistors R1 and R2 may be connected in parallel to the input terminal of the lighting unit 200, and the resistor R2 is configured between the input terminal of the lighting unit 200 and the gate of the NMOS transistor T2. The resistor R2, the Zener diode ZD1 for preventing an overvoltage, the capacitor C1 and the NPN transistor Q1 are connected to the gate of the NMOS transistor T1 in common. The sensing resistor Rs and the resistor R3 are connected in parallel to the sensing terminal Ri, and the resistor R3 is connected to the base of the NPN transistor Q1.

When the NMOS transistor T1 is turned on, the leakage current path is formed by the resistor R1 and the NMOS transistor T1.

The NMOS transistor T1 is turned on or off by a charging voltage of the capacitor C1.

The NPN transistor Q1 is turned on by a voltage applied to the resistor R3 when a sufficient driving current Id equal to or more than a predetermined level flows due to the sequential light emission of the lighting unit 200, and turned off by a voltage applied to the resistor R3 when the rectified voltage becomes so low that the driving current Id less than the predetermined level flows or the driving current Id does not flow. The NPN transistor Q1 is turned on in a section where the sensing voltage applied across the sensing resistor Rs by the driving current Id is higher than a base-emitter turn-on voltage.

The capacitor C1 is charged by a current supplied through the resistor R2 when the NPN transistor Q1 is turned off, and discharged when the NPN transistor Q1 is turned on.

That is, the leakage current control unit 400 is connected to the input terminal of the lighting unit 200 and provides the leakage current path formed by the NMOS transistor T1 between the input terminal of the lighting unit 200 and the ground, when the rectified voltage Vrec is retained at the predetermined voltage or less for the preset time or more, by sensing the driving current Id outputted from the driving current path of the driver 300.

For this operation, the leakage current control unit 400 includes the NPN transistor Q1 serving as a first switching element, the capacitor C1, and the NMOS transistor T1 serving as a second switching element. The NPN transistor Q1 maintains a turn-off state in response to the rectified voltage Vrec which is retained at the predetermined voltage or less for the preset time or more by sensing the driving current Id outputted from the driving current path of the driver 300. The capacitor C1 is charged with the rectified voltage Vrec applied to the input terminal of the lighting unit 200 when the NPN transistor Q1 maintains the turn-off state. The NMOS transistor T1 is connected to the input terminal of the lighting unit 200, turned on by the charging voltage of the capacitor C1 charged with the rectified voltage Vrec which is retained at the predetermined voltage or less for the preset time or more, and forms the leakage current path between the input terminal of the lighting unit 200 and the ground.

Figure 4:
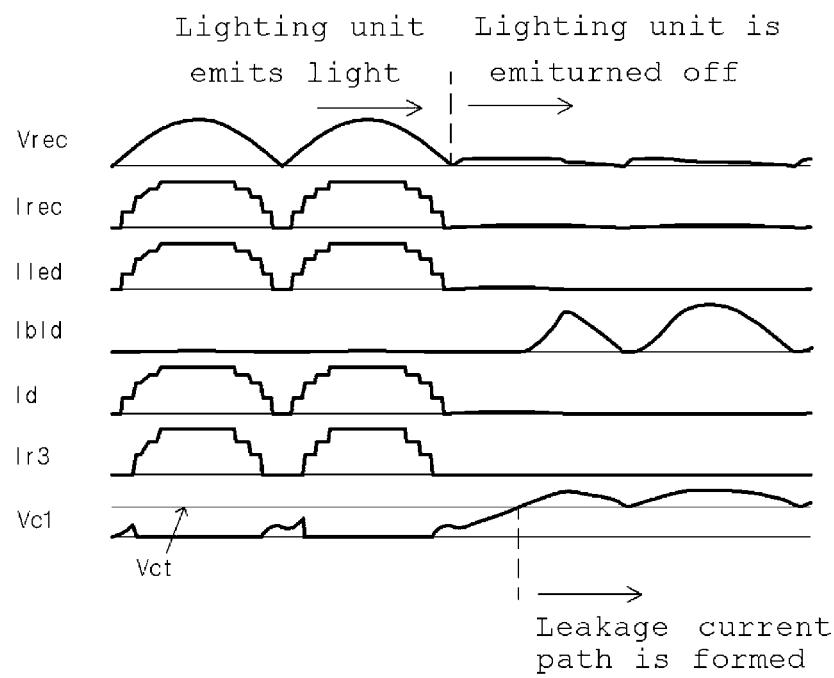
FIG. 4 is a waveform diagram for describing an operation of the LED lighting apparatus according to the embodiment of FIG. 1, when the LED lighting apparatus is turned on/off.

This process will be described with reference to FIG. 4. FIG. 4 illustrates an output current Irec of the rectifier circuit 12, an input current Iled of the lighting unit 200, a current Ibld flowing through the leakage current path of the leakage current control unit 400, the driving current Id, a current Ir3 flowing through the resistor R3 and the charging voltage of the capacitor C1, in response to changes of the rectified voltage Vrec. At this time, the current Ibld flowing through the leakage current path of the leakage current control unit 400 and the current Ir3 flowing through the resistor R3 are formed at a considerably lower level than the other currents. In FIG. 4, however, the scales of the currents Ibld and the Ir3 are increased for the sake of contrast with the other currents. Furthermore, the charging voltage Vc1 of the capacitor C1 is also formed at a considerably lower level than the rectified voltage Vrec, but the scale of the charging voltage Vc1 is increased for the sake of contrast. In FIG. 4, Vct represents a charging voltage serving as a reference voltage for forming the leakage current path.

Referring to FIG. 4, when the rectified voltage Vrec for controlling the lighting unit 200 to emit light is normally supplied, the NPN transistor Q1 is temporarily turned on in a valley section of the rectified voltage Vrec, where the level of the driving current Id is formed at a low level, by the sensing of the driving current Id through the resistor R3, but maintains a turn-on state in the other sections. Therefore, the capacitor C1 is temporarily charged in the valley section of the rectified voltage Vrec, where the level of the driving current Id is formed at a low level, but discharged by the NPN transistor Q1 which maintains a turn-on state in the other sections.

As such, when the rectified voltage Vrec for controlling the lighting unit 200 to emit light is normally supplied so that the charging voltage of the capacitor C1 is retained at a low level, the NMOS transistor T1 is maintained in a turn-off state by a low gate voltage. That is, when the rectified voltage Vrec for controlling the lighting unit 200 to emit light is normally supplied so that the driving current Id flows enough to maintain the discharged state of the capacitor C1, the leakage current path by the leakage current control unit 400 is not formed.

On the other hand, when the rectified voltage Vrec has a phase equal to or less than the predetermined level due to the dimmer 14 or a switch (not illustrated) for transferring an AC voltage as an input voltage to the dimmer 14 is turned off, the rectified voltage Vrec equal to or less than the predetermined level is provided to the lighting unit 200 as illustrated in FIG. 4. For reference, FIG. 4 is a waveform diagram corresponding to the case in which the lighting unit 200 is switched from the light emitting state to the turn-off state.

In this case, since the driving current Id equal to or less than the predetermined level flows, the NPN transistor Q1 maintains a turn-off state. At this time, the capacitor C1 is charged by the current supplied through the resistor R2, and the current supplied to the capacitor C1 may be understood as a leakage current provided from the dimmer 14, for example. When the flow of the driving current Id equal to or less than the predetermined level is retained, the charging voltage of the capacitor C1 rises. When the charging voltage of the capacitor C1 rises to more than the level Vct that can turn on the NMOS transistor T1, the NMOS transistor T1 is turned on.

That is, when the driving current Id equal to or less than the predetermined level flows because the rectified voltage Vrec is supplied at a level for turning off the lighting unit 200 or not supplied, the capacitor C1 is charged with a leakage current by turn-off of the NPN transistor Q1. When the charging voltage of the capacitor C1 rises to turn on the NMOS transistor T1, a leakage current path is formed by the leakage current control unit 400. That is, the leakage current is discharged to the ground through the resistor R1 and the NMOS transistor T1. At this time, the leakage current may be discharged as indicated by Ibld of FIG. 4.

In the above-described configuration, the charge capacity of the capacitor C1 may be set in such a manner that the charging voltage rises to a level that can turn on the NMOS transistor T1, when the rectified voltage Vrec is retained at the predetermined voltage or less for the preset time or more.

In the embodiment of FIG. 1, when the amount of driving current Id outputted from the driving current path of the driver 300 is retained at the predetermined level or less for the preset time or more, the leakage current path may be formed by the leakage current control unit 400. Therefore, the leakage current may not be provided to the lighting unit 200, but bypassed to the ground from the input terminal of the lighting unit 200 and then discharged.

Figure 5:
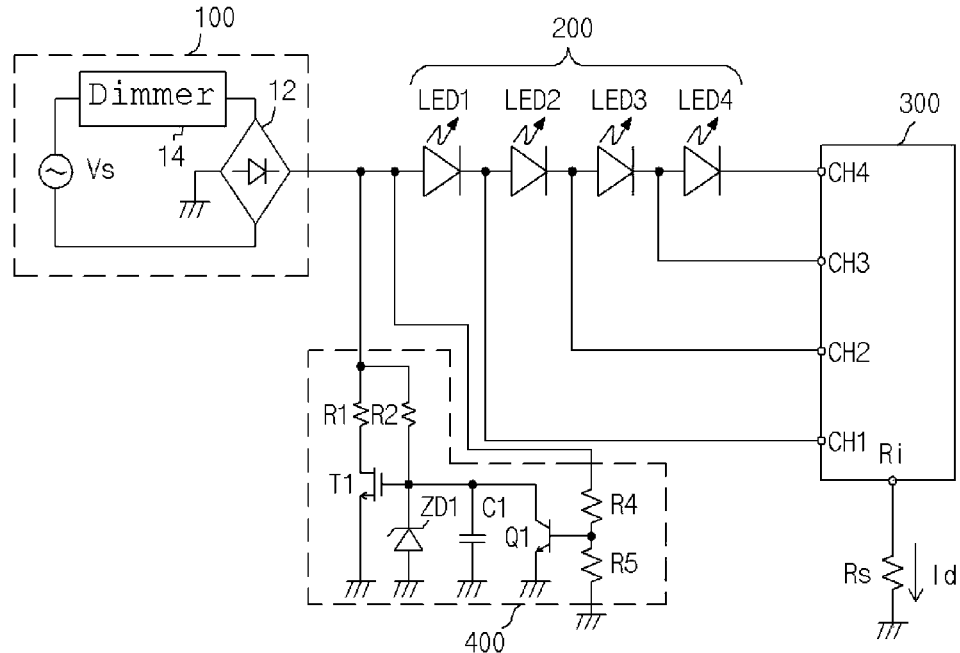
FIG. 5 is a circuit diagram illustrating an LED lighting apparatus according to another embodiment of the present invention.

As illustrated in FIG. 5, the leakage current control unit 400 may be configured to form a leakage current path connected from the input terminal of the lighting unit 200 to the ground, in order to discharge a leakage current. Furthermore, the leakage current control unit 400 may be configured to form a leakage current path when the rectified voltage Vrec applied to the lighting unit 200 is retained at the predetermined level or less for the preset time or more.

In the embodiment of FIG. 5, the power supply unit 100, the lighting unit 200 and the driver 300 are configured in the same manner as those of the embodiment of FIG. 1.

In the embodiment of FIG. 5, the leakage current control unit 400 is connected to the input terminal of the lighting unit 200, and configured to provide a leakage current path between the input terminal of the lighting unit 200 and the ground when the rectified voltage Vrec is retained at the predetermined voltage or less for the preset time or more by sensing the rectified voltage Vrec applied to the input terminal of the lighting unit 200.

For this operation, the leakage current control unit 400 includes the NPN transistor Q1 serving as a first switching element, the capacitor C1, and the NMOS transistor T1 serving as a second switching element. The NPN transistor Q1 senses the rectified voltage Vrec applied to the input terminal of the lighting unit 200, and maintains a turn-off state when the rectified voltage Vrec is retained at a predetermined voltage for a preset time or more. The capacitor C1 is charged with the rectified voltage Vrec applied to the input terminal of the lighting unit 200 when the NPN transistor Q1 maintains a turn-off state. The NMOS transistor T1 is connected to the input terminal of the lighting unit 200, turned on by the charging voltage of the capacitor C1 charged with the rectified voltage Vrec which is retained at the predetermined voltage or less for the preset time or more, and forms a leakage current path between the input terminal of the lighting unit 200 and the ground.

More specifically, the leakage current control unit 400 includes resistors R1, R2, R4 and R5, the NMOS transistor T1, the Zener diode ZD1, the capacitor C1 and the NPN transistor Q1. The leakage current control unit 400 includes the resistors R4 and R5 installed at the base of the NPN transistor Q1 and configured to divide the rectified voltage Vrec, instead of the resistor R3 of FIG. 1. Since the other components of the leakage current control unit 400 except the resistors R4 and R5 are configured in the same manner as those of the leakage current control unit 400 of FIG. 1, the duplicated descriptions thereof will be omitted herein.

The NPN transistor Q1 is turned on by the voltage divided by the resistors R4 and R5 when the rectified voltage Vrec equal to or more than the preset level is applied to the lighting unit 200, and turned off by the voltage divided by the resistors R4 and R5 when the rectified voltage Vrec falls to the predetermined level or less.

The capacitor C1 is charged by a current supplied through the resistor R2 when the NPN transistor Q1 is turned off, and discharged when the NPN transistor Q1 is turned on.

Referring to FIG. 5, when the rectified voltage Vrec for controlling the lighting unit 200 to emit light is normally supplied, the NPN transistor Q1 is temporarily turned off in a valley section of the rectified voltage Vrec by a sensing operation using the resistors R4 and R5, but maintains a turn-on state in the other sections. Therefore, the capacitor C1 is also temporarily charged in the valley section of the rectified voltage Vrec, but discharged by the NPN transistor Q1 which maintains the turn-on state in the other sections.

As such, when the rectified voltage Vrec for controlling the lighting unit 200 to emit light is normally supplied so that the charging voltage of the capacitor C1 is retained at a low level, the NMOS transistor T1 is maintained in a turn-off state by a low gate voltage. That is, when the rectified voltage Vrec for controlling the lighting unit 200 to emit light is normally supplied, a leakage current path by the leakage current control unit 400 is not formed.

On the other hand, when the rectified voltage Vrec has a phase equal to or less than the predetermined level due to the dimmer 14 or a switch (not illustrated) for transferring an AC voltage as an input voltage to the dimmer 14 is turned off, the rectified voltage Vrec equal to or less than the predetermined level is provided to the lighting unit 200.

In this case, the NPN transistor Q1 maintains the turn-off state, and the capacitor C1 is charged by the current supplied through the resistor R2. When the rectified voltage Vrec is retained at the predetermined level or less for the preset time, the charging voltage of the capacitor C1 rises. When the charging voltage of the capacitor C1 rises to more than a level that can turn on the NMOS transistor T1, the NMOS transistor T1 is turned on.

That is, when the rectified voltage Vrec is supplied at a level for turning off the lighting unit 200 or not supplied, the capacitor C1 is charged with a leakage current by turn-off of the NPN transistor Q1. When the charging voltage of the capacitor C1 rises to turn on the NMOS transistor T1, a leakage current path is formed by the leakage current control unit 400. That is, the leakage current is discharged to the ground through the resistor R1 and the NMOS transistor T1.

In the above-described configuration, the charge capacity of the capacitor C1 may be set in such a manner that the charging voltage rises to a level that can turn on the NMOS transistor T1, when the rectified voltage Vrec is retained at the predetermined voltage or less for the preset time or more.

In the embodiment of FIG. 5, when the rectified voltage Vrec is retained at the predetermined level or less for the preset time, the leakage current path may be formed by the leakage current control unit 400. Therefore, the leakage current may not be provided to the lighting unit 200, but bypassed to the ground from the input terminal of the lighting unit 200 and then discharged.

Figure 6:
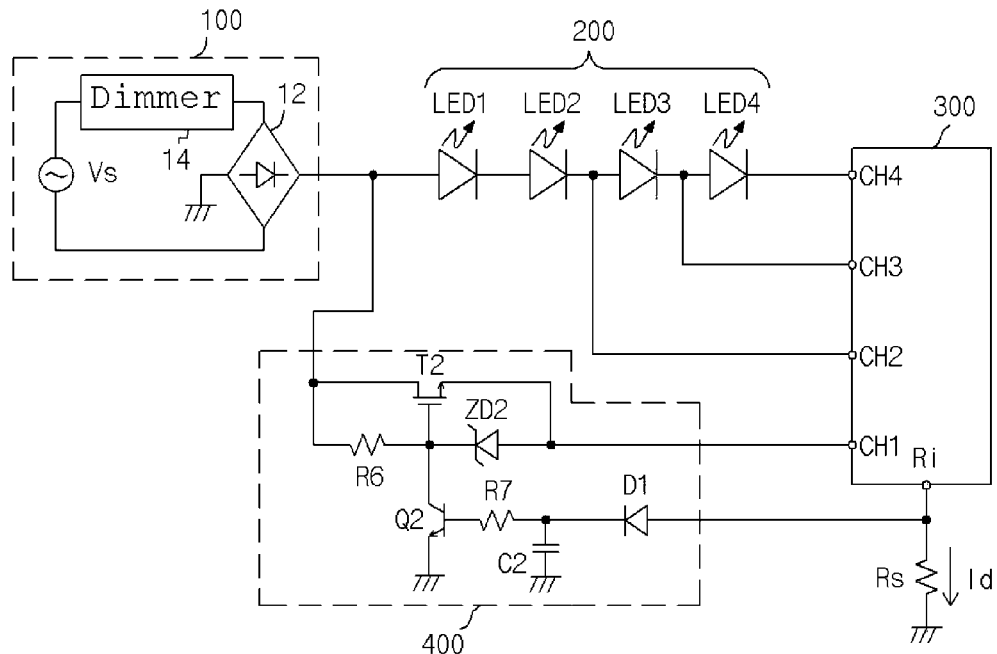
FIG. 6 is a circuit diagram illustrating an LED lighting apparatus according to still another embodiment of the present invention.

As illustrated in FIG. 6, the leakage current control unit 400 may be configured to form a leakage current path connected from the input terminal of the lighting unit 200 to the driver 300, in order to bypass a leakage current. When the amount of driving current Id outputted from the driving current path of the driver is retained at a predetermined level or less for a preset time, the leakage current control unit 400 may form the leakage current path.

The LED lighting apparatus according to the embodiment of FIG. 6 may include the power supply unit 100, the lighting unit 200 and the driver 300, like the embodiment of FIG. 1.

In the embodiment of FIG. 6, the channel terminal CH1 of the driver 300 is connected to the leakage current path of the leakage current control unit 400, and the LED light source LED1 of the lighting unit 200 is not connected to the channel terminal CH1 of the driver 300.

Therefore, the LED light source LED1 does not emit light when the rectified voltage Vrec reaches the light emission voltage V1, but emits light at the same time as the LED light source LED2 when the rectified voltage Vrec reaches the light emission voltage V2. Therefore, the driving current Id starts to flow from the point of time that the LED light sources LED1 and LED2 emit light at the same time in response to a rise of the rectified voltage Vrec, and the flow of the driving current Id is stopped from the point of time that the LED light sources LED1 and LED2 are turned off at the same time in response to a fall of the rectified voltage Vrec.

Since the power supply unit 100, the lighting unit 200 and the driver 300 in the embodiment of FIG. 6 are configured in the same manner as those of the embodiment of FIG. 1 except the configuration between the LED light source LED1 and the channel terminal CH1 of the driver 300, the duplicated descriptions thereof will be omitted herein.

For convenience of description in the embodiment of FIG. 6, the leakage current path provided by the driver 300 is referred to as a first leakage current path, and the leakage current path provided by the leakage current control unit 400 is referred to as a second leakage current path.

The driver 300 is configured to selectively provide the first leakage current path for a leakage current inputted to the input terminal of the lighting unit 200 and the driving current path for sequential light emission of the lighting unit 200, in response to changes of the rectified voltage Vrec. In the driver 300, the first leakage current path may be formed between the channel terminal CH1 and the sensing resistor terminal Ri, and the driving current path may be formed between the channel terminals CH2 to CH4 and the sensing resistor terminal Ri.

The first leakage current path and the driving current path of the driver 300 are connected to the same output terminal, i.e. the sensing resistor terminal Ri, and the driver 300 compares a sensing voltage of the sensing resistor Rs, obtained by sensing the driving current Id, to preset internal reference voltages, and provides the first leakage current path to a position to which the second leakage current path is connected by the leakage current control unit 400, i.e. the channel terminal CH1, or provides the driving current path to positions corresponding to the sequential light emissions of the LED light sources LED1 to LED4, i.e. the channel terminals CH2 to CH4.

The driver 300 provides the first leakage current path by comparing the sensing voltage to a first reference voltage having the lowest level, and provides the driving current path by comparing the sensing voltage to second reference voltages which are higher than the first reference voltage and preset for the respective LED light sources LED2 to LED4. Thus, the driver 300 forms the first leakage current path in response to the rectified voltage Vrec having a lower level than the rectified voltage Vrec at which the driving current path is provided.

The leakage current control unit 400 of FIG. 6 is connected in parallel to the input terminal of the lighting unit 200, and provides the second leakage current path for discharging a leakage current inputted to the lighting unit 200 through the first driving current path of the driver 300.

That is, when the rectified voltage Vrec is retained at the predetermined voltage or less for the preset time or more, the leakage current control unit 400 provides the second leakage current path for discharging the leakage current inputted to the input terminal of the lighting unit 200 to the first leakage current path of the driver 300.

The leakage current control unit 400 is connected to the input terminal of the lighting unit 200, and senses a current outputted through one of the first leakage current path and the driving current path of the driver 300. When the rectified voltage Vrec is retained at the predetermined voltage or less for the preset time or more, the leakage current control unit 400 provides the second leakage current path between the input terminal of the lighting unit 200 and the first leakage current path of the driver 300.

For this operation, the leakage current control unit 400 includes a capacitor C2, an NPN transistor Q2 serving as a first switching element, and an NMOS transistor T2 serving as a second switching element. The capacitor C2 is charged by a current outputted through one of the first leakage current path and the driving current path of the driver 300. The NPN transistor Q2 is turned off in response to the state of charge of the capacitor C2 charged with the rectified voltage Vrec which is retained at the predetermined voltage or less for the preset time or more. The NMOS transistor T2 is connected to the input terminal of the lighting unit 200, and forms the second leakage current path between the input terminal of the lighting unit 200 and the first leakage current path of the driver 300 in response to turn-off of the NPN transistor Q2.

More specifically, the leakage current control unit 400 includes resistors R6 and R7, the NMOS transistor T2, a Zener diode ZD2, the capacitor C2 and the NPN transistor Q2. Here, a diode D1 may be configured to prevent a current from flowing from the capacitor C2 to the sensing resistor Rs.

The NMOS transistor T2 has a source connected to the input terminal of the lighting unit 200 and a drain connected to the channel terminal CH1 of the driver 300. The resistor R6 is configured between the source and gate of the NMOS transistor T2, and the Zener diode ZD2 is configured to between the drain and gate of the NMOS transistor T2. The NPN transistor Q2 is configured at the gate of the NMOS transistor T2, and the base of the NPN transistor Q2 is configured to sense the driving current Id outputted from the driver 300 through the resistor R7. The capacitor C2 is configured in parallel to the resistor R7, and charged by the current flowing through the diode D1.

According to the above-described configuration, the leakage current control unit 400 forms the second leakage current path when the NMOS transistor T2 is turned on. The second leakage current path formed by the NMOS transistor T2 is connected to the first leakage current path between the channel terminal CH1 of the driver 300 and the sensing resistor terminal Ri.

The NMOS transistor T2 is turned on by a gate voltage formed by the resistor R6, when the NPN transistor Q2 is turned off. Also, the NMOS transistor T2 is turned off by a low gate voltage when the NPN transistor Q2 is turned on.

The turn-on and turn-off of the NPN transistor Q2 are decided by the charging voltage of the capacitor C2.

Thus, the capacitor C2 is charged by the driving current Id when the sufficient driving current Id equal to or more than the predetermined level flows due to the sequential light emission of the lighting unit 200, and discharged when the rectified voltage Vrec becomes so low that the driving current Id less than the predetermined level flows or the driving current Id does not flow.

Figure 7:
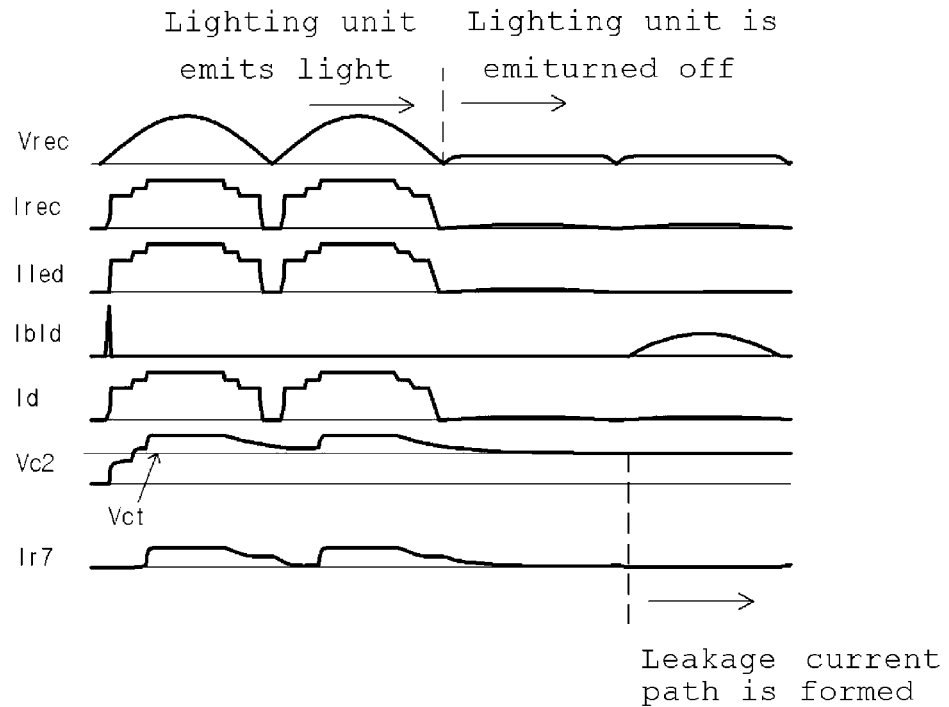
FIG. 7 is a waveform diagram for describing an operation of the LED lighting apparatus according to the embodiment of FIG. 6, when the LED lighting apparatus is turned on/off.

This process will be described with reference to FIG. 7. FIG. 7 illustrates an output current Irec of the rectifier circuit 12, an input current Iled of the lighting unit 200, a current Ibld flowing through the leakage current path of the leakage current control unit 400, the driving current Id, the charging voltage Vc2 of the capacitor C2, and a current Ir3 flowing through the resistor R7, in response to the changes of the rectified voltage Vrec.

When the rectified voltage Vrec for controlling the lighting unit 200 to emit light is normally supplied, the NPN transistor Q2 is temporarily turned off in the valley section of the rectified voltage Vrec, where the level of the driving current Id is formed at a low level, but maintains a turn-on state in the other sections. At this time, the capacitor C2 is temporarily discharged in the valley section of the rectified voltage Vrec, where the level of the driving current Id is formed at a low level, but retains a charging voltage equal to or more than the predetermined level, using the driving current Id which is retained at the predetermined level or more in the other sections.

As such, when the rectified voltage Vrec for controlling the lighting unit 200 to emit light is normally supplied so that the charging voltage of the capacitor C2 is retained at the predetermined level or more, the NPN transistor Q2 is maintained in a turn-on state, and the NMOS transistor T1 is maintained in a turn-off state by a low gate voltage. That is, when the rectified voltage Vrec for controlling the lighting unit 200 to emit light is normally supplied so that the driving current Id flows enough to maintain the state of charge of the capacitor C2, the second leakage current path by the leakage current control unit 400 is not formed.

On the other hand, when the rectified voltage Vrec has a phase equal to or less than the predetermined level due to the dimmer 14 or a switch (not illustrated) for transferring an AC voltage as an input voltage to the dimmer 14 is turned off, the rectified voltage Vrec equal to or less than the predetermined level is provided to the lighting unit 200 as illustrated in FIG. 7. For reference, FIG. 7 is a waveform diagram corresponding to the case in which the lighting unit 200 is switched from the light emitting state to the turn-off state.

In this case, since the driving current Id less than the predetermined level flows, the charging voltage of the capacitor C2 is retained at a low level which is equal to or less than the voltage Vct, the NPN transistor Q2 maintains a turn-off state, and the NMOS transistor T2 is turned on.

That is, when the rectified voltage Vrec is supplied at a level for turning off the lighting unit 200 or not supplied so that the driving current Id less than the predetermined level flows, the NMOS transistor T1 is turned on by the discharge of the capacitor C2. As a result, the second leakage current path is formed by the leakage current control unit 400.

In this case, the leakage current flows to the first leakage current path of the driver 300 via the second leakage current path of the leakage current control unit 400. At this time, the first leakage current path of the driver 300 maintains a normal turn-on state in response to the low rectified voltage at which the lighting unit 200 is turned off. Thus, the leakage current outputted from the leakage current control unit 400 flows through the first leakage current path of the driver 300 and the sensing resistor Rs.

In the above-described configuration, the charge capacity of the capacitor C2 may be set in such a manner that the charging voltage falls to a level that can turn on the NPN transistor Q2, when the rectified voltage Vrec is retained at the predetermined level or less for the preset time or more.

In the embodiment of FIG. 6, when the amount of driving current Id outputted from the driving current path of the driver 300 is retained at the predetermined level or less for the preset time or more, the second leakage current path may be formed by the leakage current control unit 400. Therefore, the leakage current is not provided to the lighting unit 200, but discharged to the ground through the second leakage current path of the leakage current control unit 400, the first leakage current path of the driver 300 and the sensing resistor Rs from the input terminal of the lighting unit 200.

Figure 8:
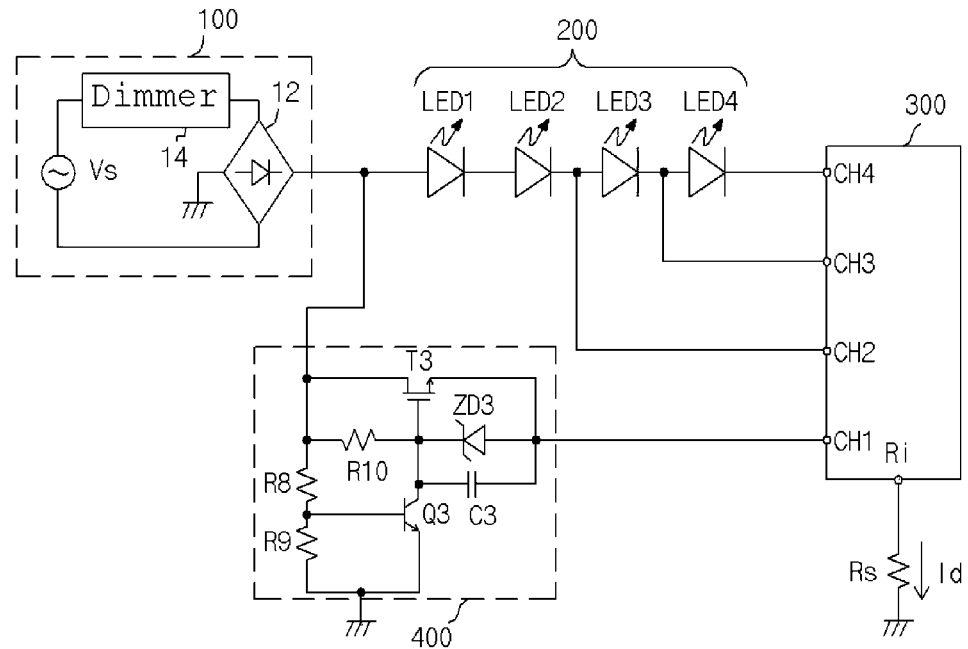
FIG. 8 is a circuit diagram illustrating an LED lighting apparatus according to yet another embodiment of the present invention.

The leakage current control unit 400 according to the present embodiment may form the second leakage current path connected to the first leakage current path of the driver 300 from the input terminal of the lighting unit 200 to discharge a leakage current, as illustrated in FIG. 8.

In the embodiment of FIG. 8, the power supply unit 100, the lighting unit 200 and the driver 300 are configured in the same manner as the embodiment of FIG. 6.

When the rectified voltage Vrec applied to the lighting unit 200 is retained at the predetermined level or less for the preset time or more, the leakage current control unit 400 may determine that the driving state of the lighting unit 200 corresponds to a leakage current interrupting condition, and form a leakage current path.

That is, the leakage current control unit 400 is connected to the input terminal of the lighting unit 200, senses the rectified voltage Vrec applied to the input terminal of the lighting unit 200, and provides the second leakage current path between the input terminal of the lighting unit 200 and the first leakage current path of the driver 300 when the rectified voltage Vrec is retained at the predetermined voltage or less for the preset time or more.

For this operation, the leakage current control unit 400 includes an NPN transistor Q3 serving as a first switching element, a capacitor C3, and an NMOS transistor T3 serving as a second switching element. The NPN transistor Q3 senses the rectified voltage Vrec applied to the input terminal of the lighting unit 200, and maintains a turn-off state when the rectified voltage Vrec is retained at the predetermined voltage or less for the preset time or more. The capacitor C3 is charged with the rectified voltage Vrec applied to the input terminal of the lighting unit 200 when the NPN transistor Q3 maintains the turn-off state. The NMOS transistor T3 is connected to the input terminal of the lighting unit 200, turned on by the charging voltage of the capacitor C3 charged with the rectified voltage Vrec which is retained at the predetermined voltage or less for the preset time or more, and forms the second leakage current path between the input terminal of the lighting unit 200 and the first leakage current path of the driver 300.

More specifically, the leakage current control unit 400 includes resistors R8 to R10, the NMOS transistor T3, a Zener diode ZD3, the capacitor C3 and the NPN transistor Q3.

The NMOS transistor T3 has a source connected to the input terminal of the lighting unit 200 and a drain connected to the channel terminal CH1 of the driver 300. The resistor R10 is configured between the source and gate of the NMOS transistor T3, and the Zener diode ZD3 and the capacitor C3 are connected in parallel to each other and configured between the drain and gate of the NMOS transistor T3. The gate of the NMOS transistor T3 is connected to the collector of the NPN transistor Q3. The resistors R8 and R9 for dividing the rectified voltage Vrec applied to the input terminal of the lighting unit 200 are connected in parallel to the base of the NPN transistor Q3. The channel terminal CH1 of the driver 300 is connected to a node to which the drain of the NMOS transistor T3, the Zener diode ZD3 and the capacitor C3 are connected in common.

The NPN transistor Q3 is turned on by the voltage divided by the resistors R8 and R9 when the rectified voltage Vrec equal to or more than the predetermined level is applied to the lighting unit 200, and turned off by the voltage divided by the resistors R8 and R9 when the rectified voltage Vrec falls to the predetermined level or less.

The capacitor C3 is charged by a current supplied through the resistor R10 when the NPN transistor Q3 is turned off, and discharged when the NPN transistor Q3 is turned on.

Referring to FIG. 8, when the rectified voltage Vrec for controlling the lighting unit 200 to emit light is normally supplied, the NPN transistor Q3 is temporarily turned off in a valley section of the rectified voltage Vrec by a sensing operation using the resistors R8 and R9, but maintains a turn-on state in the other sections. Therefore, the capacitor C3 is also temporarily charged in the valley section of the rectified voltage Vrec, but discharged by the NPN transistor Q3 which maintains the turn-on state in the other sections.

As such, when the rectified voltage Vrec for controlling the lighting unit 200 to emit light is normally supplied so that the charging voltage of the capacitor C3 is retained at a low level, the NMOS transistor T3 is maintained in a turn-off state by a low gate voltage. That is, when the rectified voltage Vrec for controlling the lighting unit 200 to emit light is normally supplied, the second leakage current path by the leakage current control unit 400 is not formed.

On the other hand, when the rectified voltage Vrec has a phase equal to or less than the predetermined level due to the dimmer 14 or a switch (not illustrated) for transferring an AC voltage as an input voltage to the dimmer 14 is turned off, the rectified voltage Vrec equal to or less than the predetermined level is provided to the lighting unit 200.

In this case, the NPN transistor Q3 maintains a turn-off state, and the capacitor C3 is charged by a current supplied through the resistor R10. When the rectified voltage Vrec is retained at the predetermined level or less for the preset time, the charging voltage of the capacitor C3 rises. When the charging voltage of the capacitor C3 rises to more than a level that can turn on the NMOS transistor T3, the NMOS transistor T3 is turned on.

That is, when the rectified voltage Vrec is supplied at a level for turning off the lighting unit 200 or not supplied, the capacitor C3 is charged with a leakage current by turn-off of the NPN transistor Q3. When the charging voltage of the capacitor C3 rises to turn on the NMOS transistor T3, the second leakage current path is formed by the leakage current control unit 400.

In this case, the leakage current flows to the first leakage current path of the driver 300 via the second leakage current path of the leakage current control unit 400. At this time, the second driving current path of the driver 300 maintains a normal turn-on state in response to the low rectified voltage at which the lighting unit 200 is turned off. Thus, the leakage current outputted from the leakage current control unit 400 is discharged through the first leakage current path of the driver 300 and the sensing resistor Rs.

In the above-described configuration, the charge capacity of the capacitor C3 may be set in such a manner that the charging voltage rises to a level that can turn on the NMOS transistor T3, when the rectified voltage Vrec is retained at the predetermined voltage or less for the preset time or more.

In the embodiment of FIG. 8, when the rectified voltage Vrec applied to the lighting unit 200 is retained at the predetermined level or less for the preset time, the leakage current path may be formed by the leakage current control unit 400. Therefore, the leakage current is not provided to the lighting unit 200, but discharged to the ground through the second leakage current path of the leakage current control unit 400, the first leakage current path of the driver 300 and the sensing resistor Rs from the input terminal of the lighting unit 200.

Figure 9:
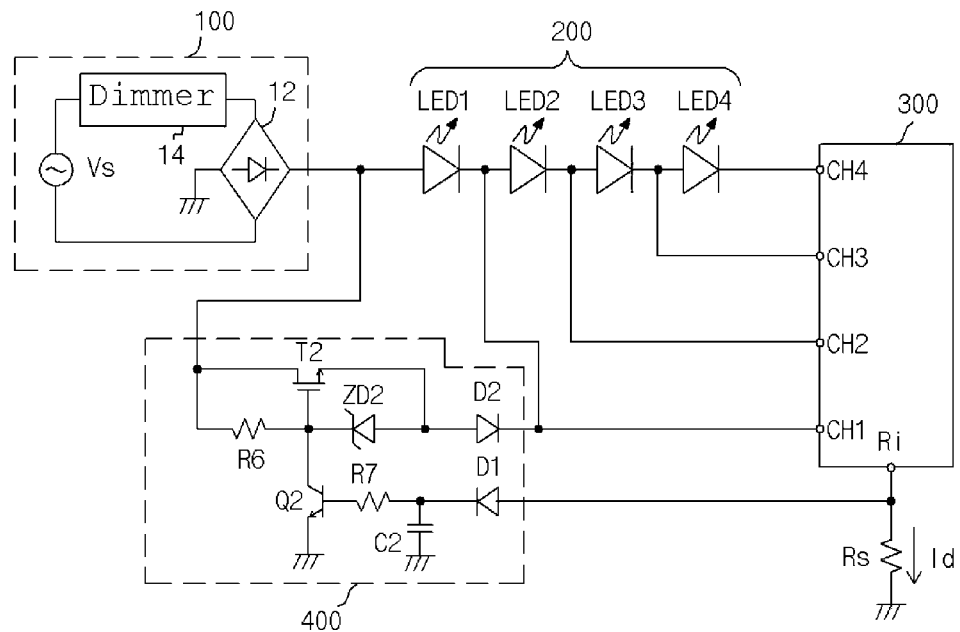
FIG. 9 is a circuit diagram illustrating an LED lighting apparatus according to further embodiment of the present invention.

As illustrated in FIG. 9, the leakage current control unit 400 is connected in parallel to the LED light source LED1 that first emits light when the plurality of LED light sources LED1 to LED4 sequentially emits light, and configured to discharge a leakage current inputted to the lighting unit 200 through the driving current path of the driver 300 for the LED light source LED.

When the rectified voltage Vrec is retained at the predetermined voltage or less for the preset time or more, the leakage current control unit 400 provides a leakage current path for discharging the leakage current inputted to the input terminal of the lighting unit 200 to the driving current path for light emission of the LED light source LED1 of the driver 300.

In the embodiment of FIG. 9, the power supply unit 100, the lighting unit 200 and the driver 300 are configured in the same manner as the embodiment of FIG. 1, and the leakage current control unit 400 is configured in the same manner as the embodiment of FIG. 6.

Since the embodiment of FIG. 9 is configured in the same manner as the embodiment of FIG. 6 except that the output terminal of the LED light source LED1 is connected to the channel terminal CH1 of the driver 300, the duplicated descriptions thereof will be omitted herein.

The embodiment of FIG. 9 is different from the embodiment of FIG. 6 in that the driving current path between the channel terminal CH1 of the driver 300 and the sensing resistor terminal Ri is used for a flow of the driving current related to light emission of the LED light source LED1 and a flow of the leakage current provided by the leakage current control unit 400.

In FIG. 9, the leakage current control unit 400 is connected to the input terminal of the lighting unit 200, senses the driving current Id outputted from the driving current path of the driver 300, and provides a leakage current path for discharging a leakage current to the input terminal of the lighting unit 200 and the driving current path for light emission of the LED light source LED1 of the driver 300, when the rectified voltage Vrec is retained at the predetermined voltage or less for the preset time or more.

For this operation, the leakage current control unit 400 includes the capacitor C2, the NPN transistor Q2 serving as a first switching element, and the NMOS transistor T2 serving as a second switching element. The capacitor C2 is charged by the driving current Id outputted from the driving current path of the driver 300. The NPN transistor Q2 is turned off in response to the state of charge of the capacitor C2 charged by the rectified voltage Vrec which is retained at the predetermined voltage or less for the preset time or more. The NMOS transistor T2 is connected to the input terminal of the lighting unit 200, and forms a leakage current path between the input terminal of the lighting unit 200 and the driving current path for light emission of the LED light source LED1 of the driver 300 in response to turn-off of the NPN transistor Q2.

Figure 10:
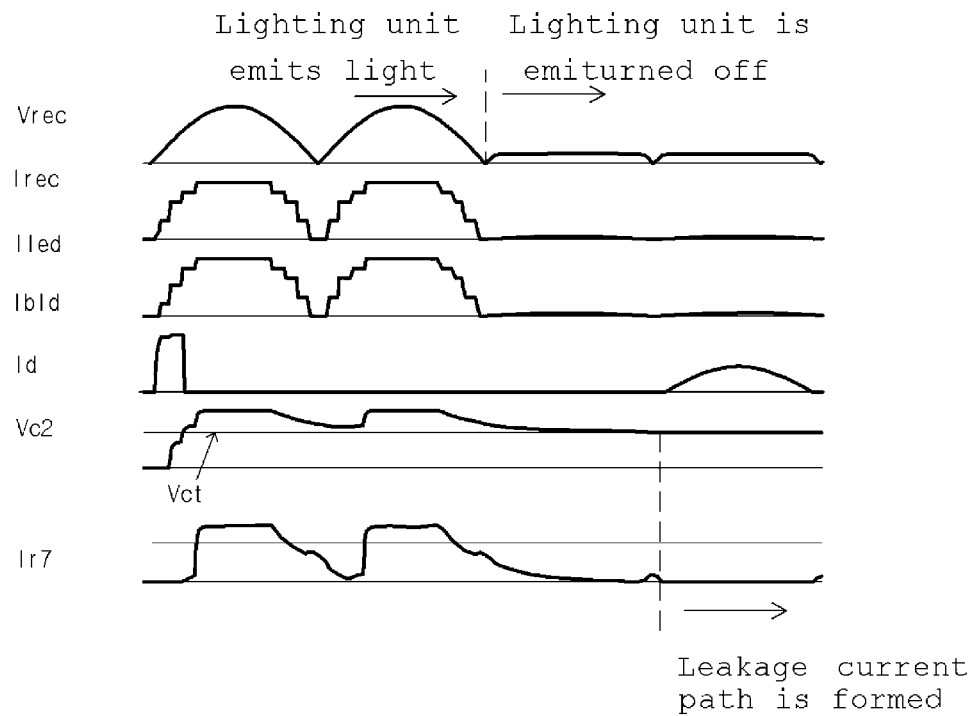
FIG. 10 is a waveform diagram for describing the operation of the LED lighting apparatus according to the embodiment of FIG. 9, when the LED lighting apparatus is turned on/off.

The change in charging voltage of the capacitor C2 and the change in current flowing through the resistor R7 in the case that the rectified voltage Vrec is normally retained and the case that the driving state of the lighting unit 200 corresponds to the preset leakage current interrupting condition will be able to be understood with reference to FIG. 10.

FIG. 10 illustrates an output current Irec of the rectifier circuit 12, an input current Iled of the lighting unit 200, a current Ibld flowing to the leakage current path of the leakage current control unit 400, the driving current Id, the charging voltage Vc2 of the capacitor C2, and a current Ir7 flowing through the resistor R7, in response to the change of the rectified voltage Vrec.

Figure 11:
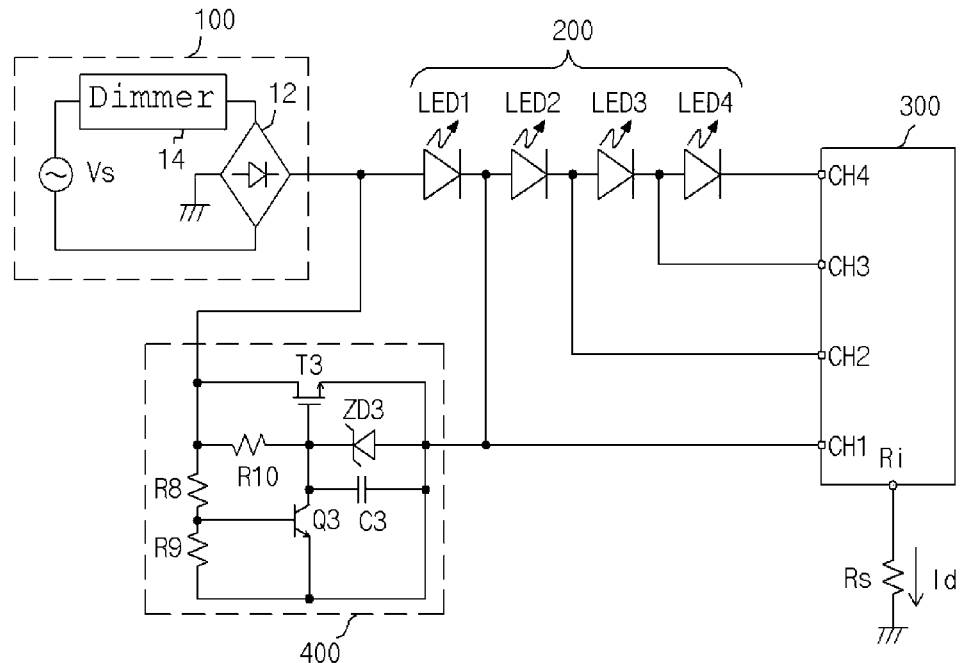
FIG. 11 is a circuit diagram illustrating an LED lighting apparatus according to still further embodiment of the present invention.

As illustrated in FIG. 11, the leakage current control unit 400 may be configured to form a leakage current path when a voltage applied across the LED light source LED1 is retained at a predetermined level or less for a preset time.

The leakage current control unit 400 is connected to the input terminal of the lighting unit 200, senses the rectified voltage Vrec applied to the input terminal of the lighting unit 200, and provides the leakage current path between the input terminal of the lighting unit 200 and the driving current path for light emission of the LED light source LED1 of the driver 300 when the rectified voltage Vrec is retained at the predetermined voltage or less for the preset time or more.

In the embodiment of FIG. 11, the power supply unit 100, the lighting unit 200 and the driver 300 are configured in the same manner as the embodiment of FIG. 1, and the leakage current control unit 400 is configured in the same manner as the embodiment of FIG. 6.

Since the embodiment of FIG. 11 is configured in the same manner as the embodiment of FIG. 8 except that the output terminal of the LED light source LED1 is connected to the channel terminal CH1 of the driver 300, the duplicated descriptions thereof will be omitted herein.

The embodiment of FIG. 11 is different from the embodiment of FIG. 8 in that the driving current path between the channel terminal CH1 of the driver 300 and the sensing resistor terminal Ri is used for a flow of the driving current related to light emission of the LED light source LED1 and a flow of the leakage current provided by the leakage current control unit 400.

In FIG. 11, the leakage current control unit 400 includes an NPN transistor Q3 serving as a first switching element, a capacitor C3, and an NMOS transistor T3 serving as a second switching element. The NPN transistor Q3 senses the rectified voltage Vrec applied to the input terminal of the lighting unit 200, and maintains a turn-off state when the rectified voltage Vrec is retained at the predetermined voltage for the preset time or more. The capacitor C3 is charged with the rectified voltage Vrec applied to the input terminal of the lighting unit 200 when the NPN transistor Q3 maintains the turn-off state. The NMOS transistor T3 is connected to the input terminal of the lighting unit 200, turned on by the charging voltage of the capacitor C3 charged with the rectified voltage Vrec which is retained at the predetermined voltage or less for the preset time or more, and forms a leakage current path between the input terminal of the lighting unit 200 and the driving current path for light emission of the LED light source LED1 of the driver 300.

Figure 12:
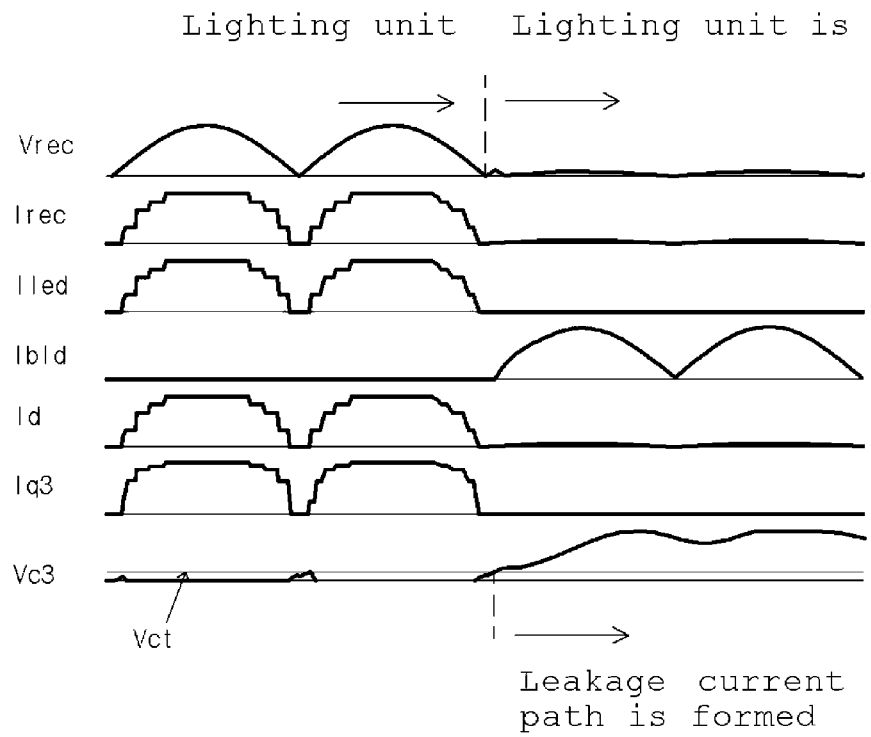
FIG. 12 is a waveform diagram for describing an operation of the LED lighting apparatus according to the embodiment of FIG. 11, when the LED lighting apparatus is turned on/off.

The change in charging voltage of the capacitor C3 in the case that the rectified voltage Vrec is normally retained and the case that the driving state of the lighting unit 200 corresponds to the preset leakage current interrupting condition will be able to be understood with reference to FIG. 12.

FIG. 12 illustrates an output current Irec of the rectifier circuit 12, an input current Iled of the lighting unit 200, a current Ibld flowing to the leakage current path of the leakage current control unit 400, the driving current Id, a current Iq3 flowing to the transistor Q3 and the charging voltage Vc3 of the capacitor C3, in response to the changes of the rectified voltage Vrec.

As described above, the LED lighting apparatus according to the embodiment of the present invention can prevent an occurrence of ghosting by a leakage current when the rectified voltage or the driving current is retained at the predetermined level or less for the preset time due to turn-off.

That is, it is possible to prevent faint light even when the LED lighting apparatus is turned off. Thus, the LED lighting apparatus can be stably turned off.

Therefore, the LED lighting apparatus can remove ghosting, thereby not only preventing light pollution caused by afterlight, but also reducing unnecessary power consumption.

Furthermore, only when the driving state of the lighting unit 200 corresponds to the leakage current interrupting condition, the LED lighting apparatus performs bleeding to remove ghosting. Thus, the entire power efficiency of the LED lighting apparatus can be improved.

The LED lighting apparatus according to the embodiment of the present invention can interrupt a retention current flowing to the LEDs serving as leakage current elements while the rectified voltage is controlled by the dimmer in order to turn off the lighting unit, and thus prevent some LEDs from emitting faint light due to the retention current.

Figure 13:
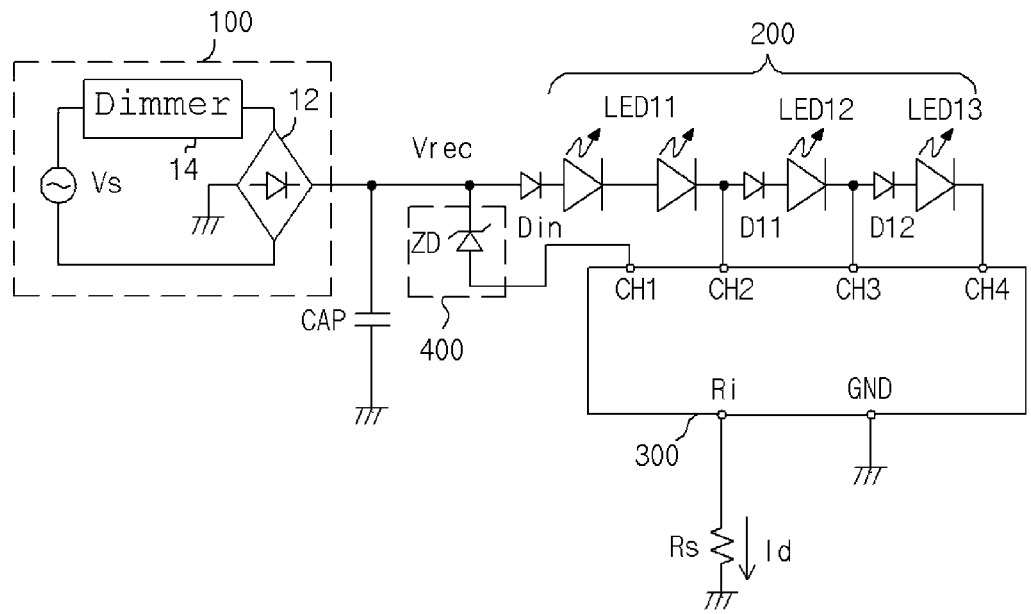
FIG. 13 is a circuit diagram illustrating an LED lighting apparatus according to yet further embodiment of the present invention.

For this operation, the present invention may be embodied as illustrated in FIG. 13. The LED lighting apparatus according to the embodiment of FIG. 13 includes a power supply unit 100, a lighting unit 200, a driver 300, a sensing resistor Rs and a leakage current control unit 400.

The power supply unit 100 rectifies an AC voltage of which the phase is controlled by a dimmer 14, and provides the rectified voltage. The lighting unit 200 includes a plurality of LED light sources LED11 to LED13 which sequentially emit light when the rectified voltage Vrec equal to or more than a first level is applied from the power supply unit 100. The leakage current control unit 400 is connected to a node between the power supply unit 100 and the lighting unit 200, and provides a leakage current path when the rectified voltage Vrec less than the first level is applied. The driver 300 forms channels connected to the leakage current path of the leakage current control unit 400 and the plurality of LED light sources LED11 to LED13, respectively, and forms a driving current path for one of the channels by comparing a sensing voltage to internal reference voltages which are preset for the respective channels. The sensing resistor Rs is connected to the driving current path of the driver 300, and provides the sensing voltage obtained by sensing the driving current Id.

The first level may be understood as a voltage level at which one or more of the LED light sources LED11 to LED13 of the lighting unit 200 emit light, and defined as a level for controlling the LED light source LED1 to emit light in the embodiment of FIG. 1.

In the above-described configuration, the power supply unit 100, the lighting unit 200, the driver 300 and the sensing resistor Rs are configured in the same manner as those of the embodiment of FIG. 6. Thus, the duplicated descriptions thereof will be omitted herein.

The LED lighting apparatus according to the embodiment of FIG. 13 includes a capacitor CAP and diodes Din, D1 and D2. The capacitor CAP is configured to guarantee a retention current between the ground and a node between the rectifier circuit 12 and the lighting unit 200, and the diodes Din, D1 and D2 are configured at input terminals of the LED light sources LED11 to LED13 and serve to pass the driving current Id in one direction while preventing a reverse current.

The leakage current control unit 400 may include a Zener diode ZD serving as a constant voltage source, and serve as a constant voltage source for the rectified voltage Vrec which is less than the first level and equal to or more than a second level decided in the range of less than 60% of the first level.

The Zener diode ZD included in the leakage current control unit 400 is connected between the channel CH1 of the driver 300 and a node between the power supply unit 100 and the lighting unit 200, and serve as a constant voltage source which maintains a normal turn-on state and across which the voltage retains the second level even though the rectified voltage Vrec rises. The second level may be decided in the range of less than 60% of the first level as described above.

Therefore, the leakage current control unit 400 provides a leakage current path for the retention current corresponding to the rectified voltage Vrec which is equal to or less than the second level less than the first level and the driving current Id corresponding to the rectified voltage which is equal to or more than the second level and less than the first level.

In response, the driver 300 may be configured to control the driving current path of the channels CH1 to CH4 to maintain a normal turn-on state in response to the rectified voltage Vrec less than the first level, and regulate the driving current Id flowing through the driving current path through the comparison between the sensing voltage and the reference voltage.

The operation of the LED lighting apparatus according to the embodiment of FIG. 13 will be able to be described with reference to FIGS. 2 to 14.

The light emission voltage V4 for controlling the LED light source LED13 to emit light is defined as the voltage at which all of the LED light sources LED11 to LED13 emit light. The light emission voltage V3 for controlling the LED light source LED12 to emit light is defined as the voltage at which both of the LED light sources LED11 and LED12 emit light. The light emission voltage V2 for controlling the LED light source LED11 emit light is defined as the voltage at which only the LED light source LED11 emits light.

Figure 14:
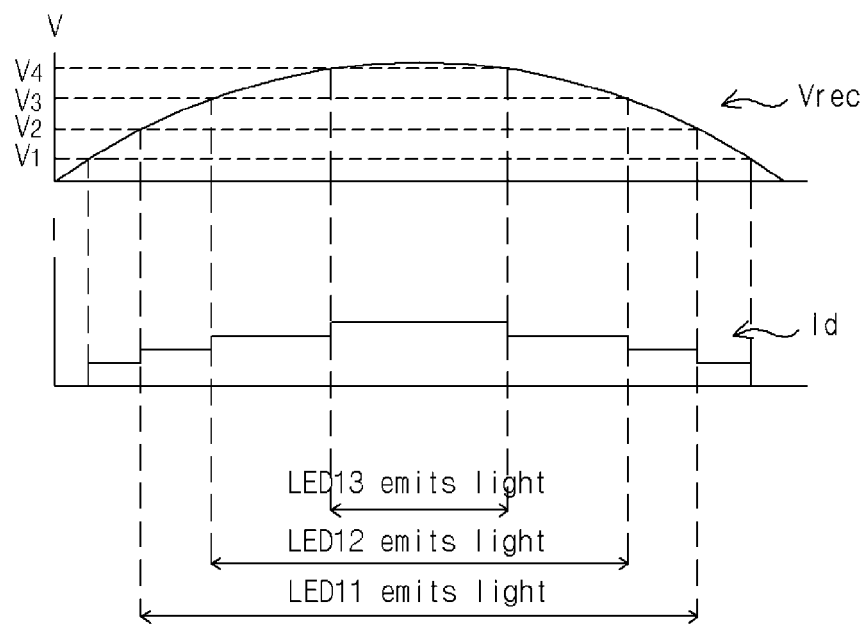
FIG. 14 is a waveform diagram for describing an operation of the LED lighting apparatus according to the embodiment of FIG. 13.

FIG. 14 illustrates the waveform of the driving current Id corresponding to the rectified voltage Vrec of which the phase angle is controlled to have a full angle by the dimmer 14.

In the present embodiment, the driving current Id indicates a current corresponding to the rectified voltage Vrec equal to or more than the second level, and the retention current indicates a current which is discharged to maintain a stable operation of the dimmer 14 in response to the rectified voltage Vrec equal to or less than the second level.

When the dimmer 14 controls the phase angle of the rectified voltage Vrec to a dimming-off level in order to turn off the lighting unit 200, the rectified voltage Vrec may be retained at the light emission voltage V2 of the LED light source LED11, i.e. a level less than the first level, or retained at the constant voltage V1 formed by the Zener diode ZD of the leakage current control unit 400, i.e. a level equal to or less than the second level.

When the rectified voltage Vrec is in the initial state, it may indicate that the rectified voltage Vrec is less than the second level, i.e. the voltage V1. Furthermore, when the rectified voltage Vrec is in the initial state, it may also indicate that the phase angle of the rectified voltage Vrec is controlled to the dimming-off level by the dimmer 14. This case may be understood as the case in which the retention current for a stable operation of the dimmer 14 needs to be discharged.

When the rectified voltage Vrec is in the initial state, the reference voltages VREF1 to VREF4 are higher than the sensing voltage of the sensing resistor Rs. Therefore, the NMOS transistors 52 of the respective switching circuits 31 to 34 of the driver 300 maintain a turn-on state.

Thus, the retention current for a stable operation of the dimmer 14 is discharged through the leakage current path of the leakage current control unit 400, the driving current path formed through the channel CH1 of the driver 300, and the sensing resistor Rs, in response to the rectified voltage Vrec in the initial state.

Then, when the rectified voltage Vrec rises to reach the voltage V1 at the first level, the first-level voltage V1, i.e. the constant voltage is applied across the Zener diode ZD of the leakage current control unit 400.

At this time, the LED light sources LED11 to LED13 maintain a turn-off state, and the driving current Id corresponding to the rectified voltage Vrec is discharged through the leakage current path of the leakage current control unit 400, the driving current path formed through the channel CH1 of the driver 300, and the sensing resistor Rs.

Since the sensing voltage at this time has a low level, the turn-on states of the switching circuits 31 to 34 are not changed.

Then, while the rectified voltage Vrec reaches the light emission voltage V2, the driving current Id is regulated to retain a constant amount through an operation of the switching circuit 31.

When the rectified voltage Vrec reaches the light emission voltage V2, the LED light source LED11 emits light. Then, when the LED light source LED11 emits light, the switching circuit 32 connected to the LED light source LED12 through the channel CH2 provides a driving current path.

When the LED light source LED11 emits light, the driving current Id starts to flow through the driving current path formed by the switching circuit 32. At this time, the level of the sensing voltage is higher than the reference voltage VREF1. Thus, the NMOS transistor 52 of the switching circuit 31 is turned off by an output of the comparator 50. That is, the switching circuit 31 is turned off, and the switching circuit 32 provides the driving current path corresponding to the light emission of the LED light source LED11.

Then, while the rectified voltage Vrec reaches the light emission voltage V3, the driving current Id is regulated to retain a constant amount through an operation of the switching circuit 32.

When the rectified voltage Vrec reaches the light emission voltage V3, the LED light source LED12 emits light. When the LED light source LED12 emits light, the switching circuit 33 connected to the LED light source LED12 provides a driving current path. At this time, the LED light source LED11 also maintains the light emitting state.

When the LED light source LED12 emits light, the driving current Id starts to flow through the driving current path formed by the switching circuit 33. At this time, the level of the sensing voltage is higher than the reference voltage VREF2. Thus, the NMOS transistor 52 of the switching circuit 32 is turned off by an output of the comparator 50. That is, the switching circuit 32 is turned off, and the switching circuit 33 provides the driving current path corresponding to the light emission of the LED light source LED12.

Then, while the rectified voltage Vrec reaches the light emission voltage V4, the driving current Id is regulated to retain a constant amount through an operation of the switching circuit 33.

When the rectified voltage Vrec reaches the light emission voltage V4, the LED light source LED13 emits light. When the LED light source LED13 emits light, the switching circuit 34 connected to the LED light source LED13 provides a driving current path. At this time, the LED light sources LED11 and LED12 also maintain the light emitting state.

When the LED light source LED13 emits light, the driving current Id starts to flow through the driving current path formed by the switching circuit 34. At this time, the level of the sensing voltage is higher than the reference voltage VREF3. Thus, the NMOS transistor 52 of the switching circuit 33 is turned off by an output of the comparator 50. That is, the switching circuit 33 is turned off, and the switching circuit 34 provides the driving current path corresponding to the light emission of the LED light source LED13.

Then, the rectified voltage Vrec starts to fall after reaching the upper limit level.

Then, while the rectified voltage Vrec reaches the upper limit level, the driving current Id is regulated to retain a constant amount through an operation of the switching circuit 34.

On the other hand, when the rectified voltage Vrec falls in a stepwise manner to the light emission voltages V4, V3 and V2 from the upper limit level, the LED light sources LED 13, LED 12 and LED11 are sequentially turned off. The driving current Id decreases in a stepwise manner in response to the turn-off of the LED light sources LED 13, LED 12 and LED11.

As described above, the driver 300 may change and provide the driving current path in response to the changes in light emitting state of the LED light sources LED11 to LED13.

In the present embodiment, the LED light source 11 of the lighting unit 200 first emits light in response to a rise of the rectified voltage Vrec.

When the rectified voltage Vrec is equal to or less than the first level at which the LED light source LED 11 can emit light, i.e. the light emission voltage V2, the retention current for a stable operation of the dimmer 14 or the driving current Id by the rectified voltage Vrec is discharged through the leakage current path of the leakage current control unit 400, the driving current path formed through the channel CH1 of the driver 300, and the sensing resistor Rs.

Therefore, before the light emission of the LED light source LED11 that first emits light, or when the rectified voltage Vrec is controlled to less than the level that turns off the lighting unit 200, the LED lighting apparatus according to the embodiment of the present invention can prevent a leakage current caused by the retention current or the driving current Id from flowing to the LED light source, and discharge the leakage current.

Therefore, the LED lighting apparatus according the embodiment of the present invention can prevent ghosting in which the lighting unit 200 emits faint light while a current flows through some of the LED light sources LED11 to LED13. As a result, unnecessary power consumption can be prevented, and the reliability of the LED lighting apparatus can be prevented from being degraded.

While various embodiments have been described above, it will be understood to those skilled in the art that the embodiments described are by way of example only. Accordingly, the disclosure described herein should not be limited based on the described embodiments.

What is claimed is:

1. An LED lighting apparatus comprising:
   a lighting unit comprising a plurality of LED light sources that sequentially emit light in response to changes of a rectified voltage;
   a driver configured to provide a driving current path for the sequential emission of the plurality of LED light sources; and
   a leakage current control unit configured to provide a leakage current path through which a leakage current inputted to an input terminal of the lighting unit is discharged to a ground, when the rectified voltage is supplied at a level for turning off the lighting unit.

2. The LED lighting apparatus of claim 1, further comprising a sensing resistor connected to the driving current path of the driver,
   wherein the driver provides the driving current path corresponding to the sequential light emission of the plurality of LED light sources by comparing a sensing voltage of the sensing resistor to internal reference voltages preset for the respective LED light sources, the sensing voltage being obtained by sensing a driving current outputted from the driving current path.

3. The LED lighting apparatus of claim 1, wherein the leakage current control unit is connected to the input terminal of the lighting unit, senses a driving current outputted from the driving current path of the driver, and provides the leakage current path between the input terminal of the lighting unit and the ground when the rectified voltage is supplied at the level for turning off the lighting unit.

4. The LED lighting apparatus of claim 3, wherein the leakage current control unit comprises:
   a first switching element configured to maintain a turn-off state in response to the rectified voltage being supplied at the level for turning off the lighting unit by sensing the driving current outputted from the driving current path of the driver;
   a capacitor charged with the rectified voltage applied to the input terminal of the lighting unit when the first switching element maintains the turn-off state; and
   a second switching element connected to the input terminal of the lighting unit, and configured to be turned on by a charging voltage of the capacitor charged with the rectified voltage being supplied at the level for turning off the lighting unit and form the leakage current path between the input terminal of the lighting unit and the ground.

5. The LED lighting apparatus of claim 1, wherein the leakage current control unit is connected to the input terminal of the lighting unit and provides the leakage current path between the input terminal of the lighting unit and the ground when the rectified voltage is supplied at the level for turning off the lighting unit by sensing the rectified voltage applied to the input terminal of the lighting unit.

6. The LED lighting apparatus of claim 5, wherein the leakage current control unit comprises:
   a first switching element configured to maintain a turn-off state when the rectified voltage is supplied at the level for turning off the lighting unit by sensing the rectified voltage applied to the input terminal of the lighting unit;
   a capacitor charged with the rectified voltage applied to the input terminal of the lighting unit when the first switching element maintains the turn-off state; and
   a second switching element connected to the input terminal of the lighting unit, configured to be turned on by a charging voltage of the capacitor charged with the rectified voltage being supplied at the level for turning off the lighting unit, and form the leakage current path between the input terminal of the lighting unit and the ground.

7. An LED lighting apparatus comprising:
   a lighting unit comprising a plurality of LED light sources that sequentially emit light in response to changes of a rectified voltage;
   a driver configured to selectively provide a first leakage current path for a leakage current inputted to an input terminal of the lighting unit and a driving current path for the sequential light emission of the plurality of LED light sources, in response to a change of the rectified voltage; and
   a leakage current control unit configured to provide a second leakage current path through which the leakage current inputted to the input terminal of the lighting unit is discharged to the first leakage current path of the driver, when the rectified voltage is supplied at a level for turning off the lighting unit.

8. The LED lighting apparatus of claim 7, further comprising a sensing resistor connected to the first leakage current path of the driver and the driving current path in common,
   wherein the driver provides the first leakage current path by comparing a sensing voltage of the sensing resistor, obtained by sensing the leakage current outputted from the first leakage current path, to an internal first reference voltage, and provides the driving current path by comparing a sensing voltage of the sensing resistor, obtained by sensing a driving current outputted from the driving current path, to internal second reference voltages which are preset for the respective LED light sources and higher than the first reference voltage.

9. The LED lighting apparatus of claim 7, wherein the leakage current control unit is connected to the input terminal of the lighting unit and provides the second leakage current path between the input terminal of the lighting unit and the first leakage current path when the rectified voltage is supplied at the level for turning off the lighting unit by sensing the current outputted through one of the first leakage current path and the driving current path of the driver.

10. The LED lighting apparatus of claim 9, wherein the leakage current control unit comprises:
    a capacitor charged by the current outputted through one of the first leakage current path and the driving current path of the driver;
    a first switching element configured to be turned off in response to a state of charge of the capacitor charged with the rectified voltage being supplied at the level for turning off the lighting unit; and a second switching element connected to the input terminal of the lighting unit, and configured to form the second leakage current path between the input terminal of the lighting unit and the first leakage current path of the driver in response to the turn-off of the first switching element.

11. The LED lighting apparatus of claim 7, wherein the leakage current control unit is connected to the input terminal of the lighting unit and provides the second leakage current path between the input terminal of the lighting unit and the first leakage current path when the rectified voltage is supplied at the level for turning off the lighting unit by sensing the rectified voltage applied to the input terminal of the lighting unit.

12. The LED lighting apparatus of claim 11, wherein the leakage current control unit comprises:
   a first switching element configured to maintain a turn-off state when the rectified voltage is supplied at the level for turning off the lighting unit by sensing the rectified voltage applied to the input terminal of the lighting unit;
   a capacitor charged with the rectified voltage applied to the input terminal of the lighting unit when the first switching element maintains the turn-off state; and
   a second switching element connected to the input terminal of the lighting unit,
   configured to be turned on by a charging voltage of the capacitor charged with the rectified voltage being supplied at the level for turning off the lighting unit, and form the second leakage current path between the input terminal of the lighting unit and the first leakage current path.

13. An LED lighting apparatus comprising:
   a lighting unit comprising a plurality of LED light sources that sequentially emit light in response to changes of a rectified voltage;
   a driver configured to provide a driving current path for the sequential emission of the plurality of LED light sources; and
   a leakage current control unit configured to provide a leakage current path through which a leakage current inputted to the input terminal of the lighting unit is discharged to the driving current path for light emission of a first LED light source of the driver, when the rectified voltage is supplied at a level for turning off the lighting unit.

14. The LED lighting apparatus of claim 13, further comprising a sensing resistor connected to the driving current path of the driver,
   wherein the driver provides the driving current path corresponding to the sequential light emission of the LED light sources by comparing a sensing voltage of the sensing resistor to internal reference voltages preset for the respective LED light sources, the sensing voltage being obtained by sensing a driving current outputted from the driving current path.

15. The LED lighting apparatus of claim 13, wherein the leakage current control unit is connected to the input terminal of the lighting unit and provides the leakage current path through which the leakage current inputted to the input terminal of the lighting unit is discharged to the driving current path for light emission of the first LED light source of the driver when the rectified voltage is supplied at the level for turning off the lighting unit, by sensing a driving current outputted from the driving current path of the driver.

16. The LED lighting apparatus of claim 13, wherein the leakage current control unit comprises:
   a capacitor charged by the diving current outputted from the driving current path of the driver;
   a first switching element configured to be turned off in response to a state of charge of the capacitor charged with the rectified voltage being supplied at the level for turning off the lighting unit; and
   a second switching element connected to the input terminal of the lighting unit, and configured to form the leakage current path between the input terminal of the lighting unit and
   the driving current path for the light emission of the first LED light source of the driver in response to the turn-off of the first switching element.

17. The LED lighting apparatus of claim 13, wherein the leakage current control unit is connected to the input terminal of the lighting unit and provides the leakage current path between the input terminal of the lighting unit and the driving current path for the light emission of the first LED light source of the driver when the rectified voltage is supplied at the level for turning off the lighting unit by sensing the rectified voltage applied to the input terminal of the lighting unit.

18. The LED lighting apparatus of claim 13, wherein the leakage current control unit comprises:
   a first switching element configured to maintain a turn-off state when the rectified voltage is supplied at the level for turning off the lighting unit by sensing the rectified voltage applied to the input terminal of the lighting unit;
   a capacitor charged with the rectified voltage applied to the input terminal of the lighting unit when the first switching element maintains the turn-off state; and
   a second switching element connected to the input terminal of the lighting unit, and configured to be turned on by a charging voltage of the capacitor charged with the rectified voltage being supplied at the level for turning off the lighting unit, and form the leakage current path between the input terminal of the lighting unit and the driving current path for the light emission of the first LED light source of the driver.

19. An LED lighting apparatus comprising:
   a power supply unit configured to rectify an AC voltage of which the phase is controlled by a dimmer, and provide the rectified voltage;
   a lighting unit comprising a plurality of LED light sources that sequentially emit light when the rectified voltage equal to or more than a first level is applied from the power supply unit;
   a leakage current control unit connected to a node between the power supply unit and the lighting unit, and configured to receive the rectified voltage, and provide a leakage current path to the node when the rectified voltage is less than the first;
   a driver having channels connected to the leakage current path of the leakage current control unit and the plurality of LED light sources, respectively, and configured to form a driving current path for one of the channels by comparing a sensing voltage to internal reference voltages preset for the respective channels; and
   a sensing resistor connected to the driving current path of the driver, and configured to provide the sensing voltage obtained by sensing a driving current.

20. The LED lighting apparatus of claim 19, wherein the leakage current control unit comprises a constant voltage source.

21. The LED lighting apparatus of claim 19, wherein the leakage current control unit serves as the constant voltage source for the rectified voltage which is less than the first level and equal to or more than a second level decided in the range of less than 60% of the first level.

22. The LED lighting apparatus of claim 19, wherein the leakage current control unit provides the leakage current path for a retention current corresponding to the rectified voltage which is equal to or less than a second level less than the first level and the driving current corresponding to the rectified voltage which is equal to or more than the second level and less than the first level.

23. The LED lighting apparatus of claim 19, wherein the driver controls the driving current path of the channels to maintain a normal turn-on state in response to the rectified voltage less than the first level, and regulates the driving current flowing through the driving current path through comparison between the sensing voltage and the reference voltage.

* * * * *